US006760676B2

(12) United States Patent
Nygaard, Jr.

(10) Patent No.: US 6,760,676 B2
(45) Date of Patent: Jul. 6, 2004

(54) ON-SCREEN TOOLS FOR EYE DIAGRAM MEASUREMENTS

(75) Inventor: Richard A Nygaard, Jr., Colorado Springs, CO (US)

(73) Assignee: Agilent Technologies, Inc., Palo Alto, CA (US)

(*) Notice: Subject to any disclaimer, the term of this patent is extended or adjusted under 35 U.S.C. 154(b) by 0 days.

(21) Appl. No.: 10/210,025

(22) Filed: Jul. 31, 2002

(65) Prior Publication Data

US 2004/0024547 A1 Feb. 5, 2004

(51) Int. Cl.[7] .............................................. G06F 19/00
(52) U.S. Cl. ....................................... 702/79; 714/819
(58) Field of Search .............................. 702/57, 64–68, 702/70, 118–126, 167, 168, 183, 190, 79; 714/704, 819; 324/76.22, 76.25; 375/224–226, 355

(56) References Cited

U.S. PATENT DOCUMENTS

| 4,204,228 | A | * | 5/1980 | Mason et al. ............... 348/181 |
| 4,449,223 | A | * | 5/1984 | Liskov et al. ............... 375/226 |
| 4,818,931 | A | * | 4/1989 | Naegeli et al. .......... 324/76.22 |
| 5,333,147 | A | * | 7/1994 | Nohara et al. ............. 375/224 |

(List continued on next page.)

OTHER PUBLICATIONS

SystheSys Research, Bit Error Rtae Test System, 2001, SystheSys Research, 11 pages.*
National Semiconductor corporation, MM54HC374/MM74HC374 Tri–State Octal D–Type Flip–Flop, 1995, 7 pages.*

Jouko Vanka, direct Digital Synthesizer with an On–chip D/A–Converter, IEe Journal of solid–state circuits, vol. 33 No. 2, Feb. 1998, pp. 218–227.*

*Primary Examiner*—Marc S. Hoff
*Assistant Examiner*—Mohamed Charioui
(74) *Attorney, Agent, or Firm*—Edward L. Miller

(57) ABSTRACT

Once an eye diagram measurement is begun and there is an eye diagram displayed, different on-screen measurement tools may be used singly, or in combination. Each measurement involves indicating with cursors and line segments regions of the eye diagram that are of interest, and a parameter or parameters associated with each measurement tool in use is reported in a (usually) separate area of the display. An Eye Limits measurement allows the specification of a point within an eye diagram, whereupon it finds and reports the eye diagram coordinates first encountered along horizontal and vertical lines extended from the selected point (i.e., "eye opening" size). The coordinates of the point itself are also reported. A Four Point Box measurement allows the construction on the eye diagram of a rectangle having sides parallel to the coordinate axes of the eye diagram. The coordinates of the rectangle are reported, as well as information about the number of points on the eye diagram that occur on or within the rectangle. A Six Point Box and a Diamond may be defined and used in a like fashion. A Slope Tool uses two end points to define an intervening line segment, whose slope and location can be adjusted to match some region of interest on the eye diagram. The pertinent information about the line segment and its end points is then reported. A Histogram measurement may be performed on any selected slice of the eye diagram. The histogram is thus of a distribution of number of hits versus either time axis location at a fixed voltage, or voltage at a fixed time location. Duplicate cursors appear on both the line defining the slice and within the histogram. Either cursor can be grabbed and moved, which then also moves the other. The scale for the number of hits for either histogram may be either linear or logarithmic.

12 Claims, 31 Drawing Sheets

U.S. PATENT DOCUMENTS

| | | | | |
|---|---|---|---|---|
| 5,774,242 A | * | 6/1998 | O'Sullivan et al. | 398/29 |
| 5,880,837 A | * | 3/1999 | Roberts | 356/450 |
| 5,896,391 A | * | 4/1999 | Solheim et al. | 714/704 |
| 6,266,170 B1 | * | 7/2001 | Fee | 398/147 |
| 6,519,302 B1 | * | 2/2003 | Bruce et al. | 375/355 |
| 6,614,434 B1 | * | 9/2003 | Finke | 345/440 |
| 2003/0097231 A1 | * | 5/2003 | Cheng | 702/108 |
| 2003/0177438 A1 | * | 9/2003 | Waschura et al. | 714/819 |

* cited by examiner

ON-SCREEN TOOLS FOR EYE DIAGRAM MEASUREMENTS

REFERENCE TO RELATED APPLICATION

The subject matter of the present Application pertains to the measurement of eye diagrams in general, and is especially well suited for use with one existing eye diagram measurement technique in particular. An implementation of that existing technique of interest is the subject matter of a U.S. patent application entitled METHOD AND APPARATUS FOR PERFORMING EYE DIAGRAM MEASUREMENTS bearing Ser. No. 10/020,673 which was filed on Oct. 29, 2001 by Richard A. Nygaard, Jr. and assigned to Agilent Technologies, Inc. An extension of that technique is also of interest, and it is described in a U.S. patent application entitled COMPOSITE EYE DIAGRAMS bearing Ser. No. 10/061,918 which was filed on Jan. 31, 2002 by Richard A. Nygaard, Jr. & Jeffrey J. Haeffele and assigned to Agilent Technologies, Inc. Because the topics described in those Applications are essentially points of departure for the present invention, and for the sake of brevity, "METHOD AND APPARATUS FOR PERFORMING EYE DIAGRAM MEASUREMENTS" and "COMPOSITE EYE DIAGRAMS" are each hereby expressly incorporated herein by reference. An additional case previously filed by those same inventors is also of interest, owing to a technique disclosed therein for linking an on-screen cursor position with data in an eye diagram data structure. The case is U.S. patent application Ser. No. 10/109,282 filed Mar. 28, 2002 entitled IDENTIFICATION OF CHANNELS AND ASSOCIATED SIGNAL INFORMATION CONTRIBUTING TO A PORTION OF A COMPOSITE EYE DIAGRAM, which issued as U.S. Pat. No. 6,668,235 on Dec. 23, 2003, and is likewise hereby incorporated by reference herein;

BACKGROUND OF THE INVENTION

Eye diagrams are a conventional format for representing parametric information about signals, and especially digital signals. Various prior art eye diagram testers are known, but we shall call the technique described in "METHOD AND APPARATUS FOR PERFORMING EYE DIAGRAM MEASUREMENTS" and "COMPOSITE EYE DIAGRAMS" (which is the preferred method for use herein), an Eye Diagram Analyzer, or EDA for short.

A modern eye diagram for a digital signal is not so much a trace formed continuously in the time domain (ala an analog oscilloscope), as it is an "eye" shape composed of closely spaced points (displayed dots, or illuminated pixels) representing many individual measurement samples (which are (time, voltage) pairs) taken upon separate instances of a signal occurring on a channel of interest, and which were then stored in a memory. Each measurement sample contributes to a displayed pixel. (In a simple case the correspondence is one to one, but the actual case might be many to one or one to many.) The eye shape appears continuous because the collection of pixels is rather dense, and because the signal is sampled at a large number of nearly adjacent locations. Unlike a true continuous technique, however, there may be detached dots that are separated from the main body of the eye shape. (Such detachment is an artifact of sampling.) A further difference with the continuous analog technique is that rare or infrequently occurring events, once sampled, do not appear faint in the display or disappear with the persistence of the CRT's phosphor. This latter difference is often quite an advantage, since it is often the case that such otherwise "hard to see" features of the trace are very much of interest.

In an eye diagram, an example of which is shown in FIG. 1, the vertical axis is voltage and the horizontal axis represents the differences in time (i.e., various offsets) between some reference event and the locations for the measurement samples. The reference event: is generally an edge of a clock signal in the system under test; represents directly or through some fixed delay the expected point in time when the value of an applied data signal would be captured by some receiving circuit in an SUT (System Under Test); and, is derived from an application of the SUT's clock to the Eye Diagram Analyzer. The time axis will generally have enough length to depict one complete eye-shape (cycle of an SUT signal) centered about the reference, with sometimes perhaps several additional eyes (cycles) before and after.

To one not familiar with eye diagrams FIG. 1 looks like a poorly synchronized or unreliably triggered trace for a periodic digital signal. Let us dwell here briefly to dispel any mystery about why an eye diagram is the way it is. To begin with, it is assumed that a (non-return-to-zero) work signal being measured is synchronous with something, typically a system clock. Let us further suppose that work signal transitions are expected to occur on falling edges of the system clock, so that the work signal is expected to be stable for sampling on the rising edge of the system clock. If we always sampled the work signal at the same time (say, at the rising edge of the system clock), then the results would be repeated instances of one point on the work signal. If the work signal always had the same value (a steady one or a steady zero), then those repeated instances would be the same (time, voltage) values, and would contribute multiple instances of the same single point to the eye diagram. But keep these two things in mind: One, we do not always sample at the exact same time, but vary it on either side of the reference, by up to, or even more than, a clock period. Two, the work signal is typically not stuck at some steady value. It is sometimes a one, sometimes a zero, and sometimes it does not transition.

So, if the work signal were stuck at one or zero, then the varying sample times would produce adjacent points forming straight lines at either the voltage for one or for zero. And if the work signal had regular transitions of one zero one zero one zero . . . then the trace would resemble a square wave (as seen on a 'scope). But most work signals are not that regular: they are sometimes high, sometimes low, and sometimes they stay at the same value from clock cycle to clock cycle. So the eye diagram contains the superposition of all the individual oscillographic trace segments of the two straight lines (one for always high, one for always low) and the transitions from high to low and from low to high. For a properly working signal the central region of each eye is empty, since the good signal never transitions except when it is supposed to.

To continue, then, different (X, Y) regions within a (sample) space containing an eye diagram represent different combinations of time and voltage. Assume that the eye diagram is composed of a number of pixels, and temporarily assume that the resolution is such that each different (X, Y) pixel position can represent a different combination of time and voltage (and vice versa), which combinations of time and voltage we shall term "measurement points." What the preferred Eye Diagram Analyzer measures is the number of times, out of a counted number of clock cycles, that the signal on the channel being monitored passed through a selected measurement point. Then another measurement point is selected, and the process repeated until there are enough measurement points for all the pixels needed for the display. Points along the visible eye diagram trace describe something about those (time, voltage) combinations that were observed to actually occur in the data signal under test. The value of a (time, voltage) combination is represented by its location, but the color or intensity of the measured result can be determined in a way that assists in appreciating the meaning of the measured data. The range over which the measurement points are varied is called a "sample space" and is defined during a measurement set-up operation. And in reality, we define the sample space and the resolution for neighboring measurement points first, start the measurement and then let the analyzer figure out later how to ascribe values to the pixels of the display. The "display" is, of course, an arbitrary graphic output device such as a printer or an X Window of some as yet unknown size in a window manager (e.g., X11) for a computer operating system. (A one-to-one correspondence between display pixels and measurement points is not required. It will be appreciated that it is conventional for display systems, such as X Windows, to figure out how to ascribe values to the pixels for an image when the correspondence between the display's pixel locations and the measurements that are the original image description is not one-to-one.)

Thus it is that a modern eye diagram trace itself is thus not a single time domain waveform (think: 'single valued function'), but is instead equivalent to an accumulation of many such instances; it can present multiple voltage (Y axis) values for a given time value (X axis). So, for example, the upper left-hand region of an eye (see FIG. 1) might represent the combination of an adequate logical one at an adequately early time relative to the SUT's clock signal, and an eye diagram whose trace passes robustly through that region indicates to us that a signal of interest is generally achieving a proper onset of voltage at a proper time. Furthermore, we note that there are also other regions, say, near the center of an eye, that are not ordinarily transited by the trace, and which if that were indeed to happen, would presumably be an indication of trouble. Thickening of the traces is indicative of jitter, a rounding of a corner is indicative of slow transitions, and so on. An eye diagram by itself cannot reveal in the time domain which isolated instance (cycle) of the data signal caused such an exception, as other types of measurements might, but it does provide timely and valid information about signal integrity within a system as it operates. In particular, by incorporating various rules for determining the intensity and color of the displayed pixels of the eye diagram trace (e.g., very long, perhaps "infinite", persistence) the eye diagram presents readily seen evidence of infrequently occurring failures or other hard to spot conditions.

The EDA of the incorporated "METHOD AND APPARATUS FOR PERFORMING EYE DIAGRAM MEASUREMENTS" operates by applying the clock signal from the SUT to a comparator circuit whose output is then delayed by a fixed amount, say about a half cycle, or some integral multiple thereof. The delayed clock comparison is then the reference mentioned above, and it used in determining when individually threshold-compared and then delayed data signals (the SUT data channels) are sampled;

This sampling of the individually threshold-compared and then delayed data signals is actually performed twice in rapid succession, a very brief (but selectable) amount of time apart. If these two successive samples are different, then the input signal transitioned through the voltage region of interest, and we call this a hit. This is the manner of sampling that accomplishes the taking of the (time, voltage) pairs that are the basic data of the eye diagram measurement, and it is an alternative to digitizing with a conventional Analog-to-Digital Converter (ADC). We use it because it works at frequencies that are impractical for ADCs.

It is typical for an Eye Diagram Analyzer to perform measurements simultaneously on a plurality of different data signals, which we shall call channels.

Different sampling voltages are obtained by varying the comparison thresholds for the data signals. In one embodiment different times are obtained by varying the amount of delay in the data channel path, while leaving the clock signal path essentially fixed. In another embodiment the delay in the data channels is held constant (and preferably at a low value) and the delay in the clock signal path is varied. Skew between data channels may removed by various techniques.

An eye diagram, then, is information about signal behavior at various time-voltage (X, Y) combinations. A simple system would be to indicate that the signal was "there" or that it wasn't. That is, respectively put either an illuminated pixel or a non-illuminated pixel at the various (X, Y) locations for the different instances of "there." This is about what an analog oscilloscope would do if it were used to create an eye diagram for some signal. However, we would notice that some parts of the trace were brighter than others, and understand that this is a (somewhat useful) artifact caused by finite persistence on the one hand (old stuff goes away) and relative rates of occurrence on the other. That is, the display ends up having an intensity component at each pixel location. This is fine as far as it goes, but we would rather not rely upon the persistence of phosphor for this effect, since the most interesting indications are apt to also be the faintest. Since we are not using an analog 'scope anyway, and have an instrument (an EDA) with memory (akin to a digital oscilloscope, timing analyzer or logic analyzer), we can gather frequency of occurrence ("attendance" ?) or degree of similarity ("dispersion" ?) data and decide after the fact what distinguishing pixel value is to go with each (X, Y) pixel location. Those pixel values can be variations in color, intensity, or both, according to whatever scheme is in use (and there are several). The general idea is that the operator configures the EDA to render the display in a way that makes the condition he is most interested is quite visible, and also such that the eye diagram as a whole is generally easy to interpret. Thus, the reader is reminded that there is usually more going on than simply the presence or absence of dots at some series of (X, Y) locations, and that we often have recourse to the notion of an associated "pixel value" at each (X, Y) position in the display. We shall denote with the symbol "V" whatever that "pixel value" is. V might be a single item, such as "ON" or "OFF" or it might be an intensity without the notion of color. On the other hand, V will often expand (be rendered) into a whole series of parameters $V_R$, $V_G$, $V_B$, where each such parameter represents the intensity of an associated primary color (whose combination is perceived as a resultant color. In any event, we shall simply write $(X, Y, V)_i$, or perhaps $(X_i, Y_i, V_i)$, depending upon which notation seems to work best for our needs at the time, and not bother to indicate any associated further expansion of a $V_i$ into its rendered component parameters of $V_R$, $V_G$, $V_B$. (And don't forget that the $(X, Y)_i$ are merely handy display system coordinate substitutes for writing the phrase "(time, voltage)$_i$ pairs".)

It is often the case that the utility of an eye diagram is needed for characterizing or discovering circumstances that are both erroneous and very occasional. It is also the case that some SUTs have a great many channels that are subject to investigation. Some busses have hundreds of member signals, for example. When faced with such circumstances, the "luxury" of having one individual eye diagram trace per SUT signal becomes an oppressive burden. We might measure it that way, and we can indeed display it that way (with four or maybe eight channels at a time), but we likely will have lost all patience and become disgusted with the whole process before we complete looking at twenty-five or more sets of four or more traces each. Surely that is the wrong way to go about analyzing the data! But on the other hand, automating the investigation is risky. Masking measurements, for example, essentially require that we formally decide ahead of time what is not of interest. The analyzer can apply the mask for us automatically and at great speed, but we will never know for sure that there was not some irregularity in there that met the mask criteria, and yet that would have been of interest to us anyway, if we had only seen it.

Accordingly, another tool is needed to assist in eye diagram analysis for situations involving a large number of channels. The needed tool is the merging into one combined eye diagram presentation of the data for separate "component" eye diagram measurements for a useful grouping of related signals. Perhaps this is as simple as taking all the signals together as one single group and producing a single combined eye diagram from the merged data. Say, for example, each separate signal would produce an eye diagram of the same general shape as the other. Then we might simply combine them as if they were being stacked on top of one another, so to speak. That is, create a resulting eye diagram that is the superposition of the component eye diagrams. (The user of a 'scope might approximate such an outcome by adjustment of vertical position controls to superimpose separate traces.) Alternatively, the signals of interest might, for timing or other signal format reasons, be construed as belonging to some family for one group and to a different family for another group. In that case we are inclined to consider each group separately, and then produce two separate combined eye diagrams, each of which corresponds to one of the groups. In any event, the operator can instruct the EDA to merge the data of individual eye diagrams for a specified plurality (family) of signals into one combined eye diagram. (However, we are going to combine copies of the arithmetic values for the sampled component data, and not mess with any notion of adjusting vertical position!) So now we have a combined eye diagram that probably has fat traces (indicating that, as expected, not all signals have simultaneous and identical rise times, voltage levels, etc.). Independent of that, we now expect that, having merged everything together, if there is something unusual going on, even if only occasionally for just one channel, we will, in principle, be able to see it. (Assuming, of course, that we do not implement some notion of short persistence.) Another assumption in this description is that the collection of data points comprising each of the component eye diagrams has the same general meaning, or type of rule for interpretation, as do the collections of data points in each of the other component eye diagrams.

We shall term such a combined eye diagram, created from the merging of data for individual component eye diagrams, a "composite" eye diagram.

In particular, then, an eye diagram analyzer can assign a plurality of SUT data signals to be members of a labeled group of channels for an eye diagram analyzer. There may be a plurality of such groups. In addition to a superposition in an (X, Y) display space of the various i—many (X, Y, V)—valued pixels for individual component eye diagrams associated with that group, other measured data for those pixels within a group can be merged in various different modes to produce corresponding composite eye diagram presentations. A central issue is to decide how to combine $V_i$ from one component eye diagram with the corresponding $V_i$ of another component eye diagram. They are combined to produce corresponding "densities" $D_i$ of some sort, and we can write either $(X_i, Y_i, D_i)$ or simply $(X, Y, D)_i$ so long as we remember just what D is. If the $D_i$ are rendered with color or intensity, the resulting composite eye diagram includes a representation (the $D_i$) of some density of transitions at each point $(X_i, Y_i)$, relative to that group as a whole. The full disaster for the various different types of density is explained in the incorporated "COMPOSITE EYE DIAGRAMS".

So, we have arrived at the following place. We have an instrument for measuring data signals and producing eye diagrams. It is preferred that the instrument be an EDA as described above and set out in detail in the incorporated Applications. That, however, it not essential for what is to follow, as it will be appreciated that the measurement tools and methods that are described below can be used in conjunction with other techniques for measuring data signals and producing eye diagrams. At a minimum, however, any such technique should be a digital one, so that collections of measured data in memory can be analyzed. The eye diagrams themselves can be individual component eye diagrams (i.e., relating to a single channel) or they can be composite eye diagrams. As eye diagrams of whatever sort, they will have time and voltage axes associated therewith, and useful inferences can be made about signal behavior from an examination of various aspects of the size and shape of the eye diagram. These include time intervals and voltage excursions obtained from various locations within the eye diagram. The measurement hardware can generally measure to accuracies greater than we can estimate from the displayed results merely by looking at the eye diagram. And merely looking at the eye diagram does not enable another person (or us at a latertime!) to appreciate exactly where on the eye diagram the estimate was made. Furthermore, if the eye diagram is made with the EDA techniques set out above, there is more data content in the eye diagram than just (time, voltage) pairs. Each pixel is an $(X, Y, V)_i$, where V is has meaning that derives from the number of hits and the number of measured clock cycles (and for composite eye diagrams, perhaps also the number of channels). We should like to be able to inquire about the $V_i$ with the ease and accuracy that we have come to expect for inquiring about time and voltage.

So far, so good. But exactly what measurements are useful, and if we are not to simply estimate by looking, how do we make these useful measurements ?

SUMMARY OF THE INVENTION

Once an eye diagram measurement is begun and there is an eye diagram displayed, any of eight different on-screen measurement tools may be used singly, or in combination. Each measurement involves indicating with cursors and line segments regions of the eye diagram that are of interest, and a parameter or parameters associated with each measurement tool in use is reported in a (usually) separate area of the display. An Eye Limits measurement allows the specification of a point within an eye diagram, whereupon it finds and reports the eye diagram coordinates first encountered along horizontal lines extended from the selected point. The coordinates of the point itself are also reported. A Four Point Box measurement allows the construction on the eye diagram of a rectangle having sides parallel to the coordinate axes of the eye diagram. The coordinates of the rectangle are reported, as well as information about the number of points on the eye diagram that occur on or within the rectangle. A Six Point Box and a Diamond may be defined and used in a like fashion. A Slope Tool uses two end points to define an intervening line segment, whose slope and location can be adjusted to match some region of interest on the eye diagram. The pertinent information about the line segment and its end points is then reported. A Histogram measurement may be performed on any horizontal or vertical slice of the eye diagram. A horizontal slice represents a portion of the time axis, while a vertical slice represents a portion of the voltage axis. The location and extent of the slice can be specified by manipulating the end points of a line segment representing the slice. A movable cursor appears on both the line defining the slice and within the histogram, and they each represent the same location in either time or voltage. Either cursor can be grabbed and moved, which then also moves the other. Depending upon the axis of the slice, the histogram is of a distribution of number of hits versus either time axis location at a fixed voltage, or voltage at a fixed time location. The scale for the number of hits for either histogram may be either linear or logarithmic. Finally, there are two independently positionable cursors each having long vertical and horizontal lines therethrough, and whose independent coordinates (positions) are reported, as well as number of hits and associated channel information for those locations on the eye diagram (should the eye diagram go through such a location).

DESCRIPTION OF A PREFERRED EMBODIMENT

Figure 1:
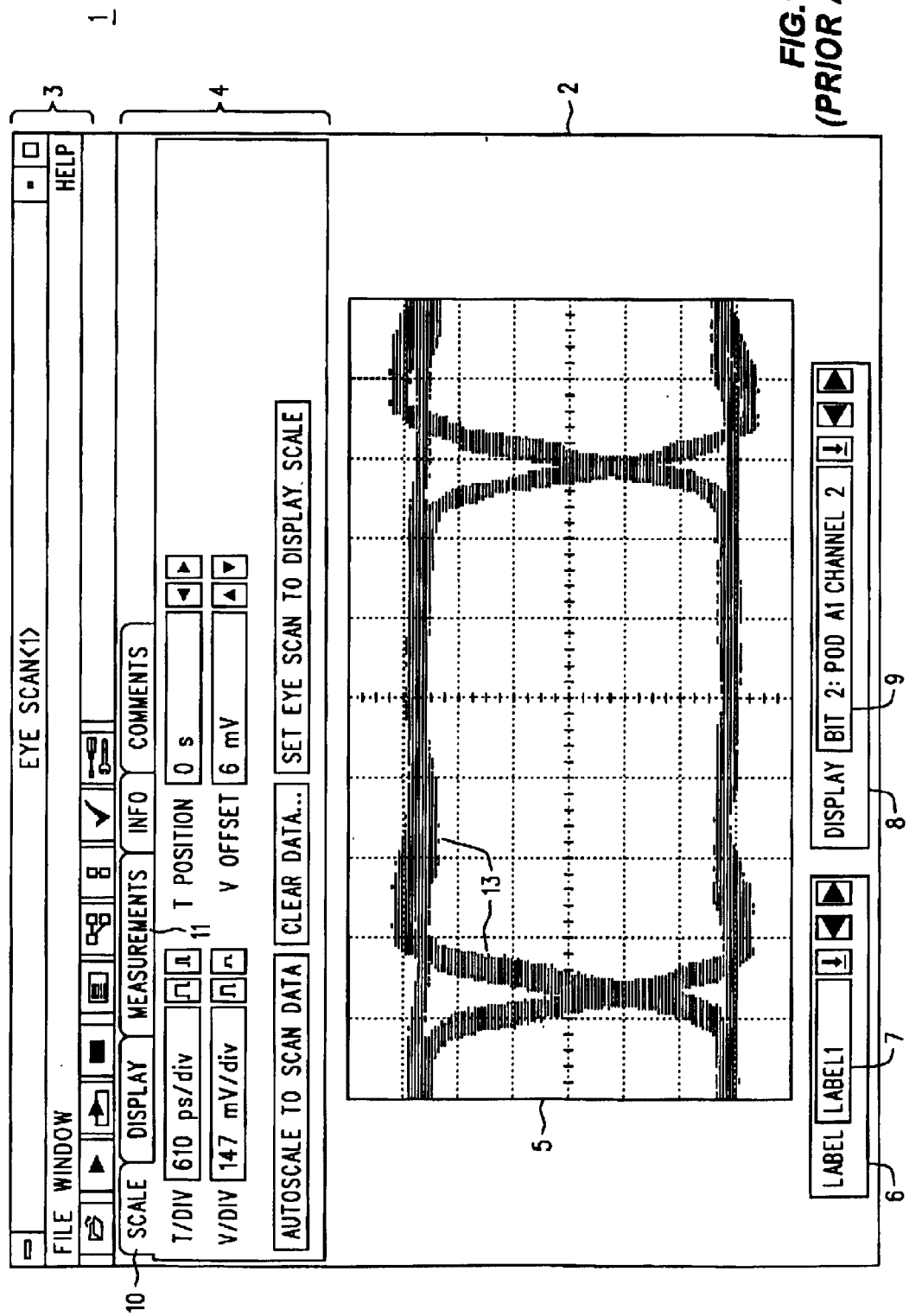
FIG. 1 is a prior art eye diagram presentation that serves as a work piece and point of departure for the subsequent description of certain on-screen tools for eye diagram measurement.

Refer now to FIG. 1, wherein is shown a prior art eye diagram presentation 1 that will serve as a basis for the examples that follow. In particular, the presentation 1 appears as a graphical image on a graphics output device, such as a CRT or LCD display, or perhaps as a printed image from a printer. (Indeed, our figures are, in substance, faithful copies of printed images that were obtained in just that way, as printed "screen shots" made on an actual eye diagram analyzer. The screen shots were, however, 600 dpi multi-color images, rather than patent drawings of solid black lines on white, so our drafting lady converted them.) The eye diagram analyzer is essentially a special purpose voltage sampling and data storage mechanism operated by an embedded (computer) system controlled by a GUI (Graphical User Interface) running under a commercial merchant operating system. See FIG. 2 in the incorporated METHOD AND APPARATUS FOR PERFORMING EYE DIAGRAM MEASUREMENTS. In a preferred embodiment the merchant operating system is RP-UX or some other Unix-like variant, such as LINUX, and the window manager is of the X Windows variety, such as X11 (or one of its variants, say X-FREE11, from GNU). Thus, instead of adjusting controls on a front panel or typing system commands on a keyboard, the operator moves a mouse, or other pointing device, and in a conventional manner "clicks" and "double clicks" on icons shown in the display. The screen pointer that is visible on the screen and moves according to mouse motion (typically a small tilted arrow, or other icon, depending upon what region of the display it is positioned within), is not shown in the figures.

In any event, the eye diagram presentation 1 is most typically viewed as an image on a screen (CRT or LCD) and comprises a window 2 whose contents include title and tool bars 3, a "tab" region 4 containing various tabs (e.g., 10 and 11, of which the SCALE tab 10 has been "clicked" to move it in front of the other tabs), and an eye diagram display region 5 containing an eye diagram 13. Window 2 also contains various other boxes and control elements 6-9 that function as part of the GUI and affect the operation of the eye diagram analyzer. In particular, controls 6 and 7 function as a label identification and selection mechanism, where a label can be used to identify a defined collection of signal input channels. Controls 8 and 9 deal with what type of eye diagram is to be displayed in region 5; there are individual component eye diagrams (for one data signal) and composite eye diagrams (say, the merger of all signals in a label). The controls shown in FIG. 1, and for all the other eye diagrams in this Application, indicate (6) that while there is a collection named "LABEL1" (7), the particular eye diagram 13 shown (8) in region 5 will be a component eye diagram (i.e., for an individual signal) called "BIT 2" and that is measured by "channel 2" of a probe pod identified as "A1" (9). It will further be noticed that the SCALE tab 10 includes various other information about voltage sensitivity, time scale, and other reference information useful in interpreting the meaning of the eye diagram 13 shown in region 5.

Figure 2:
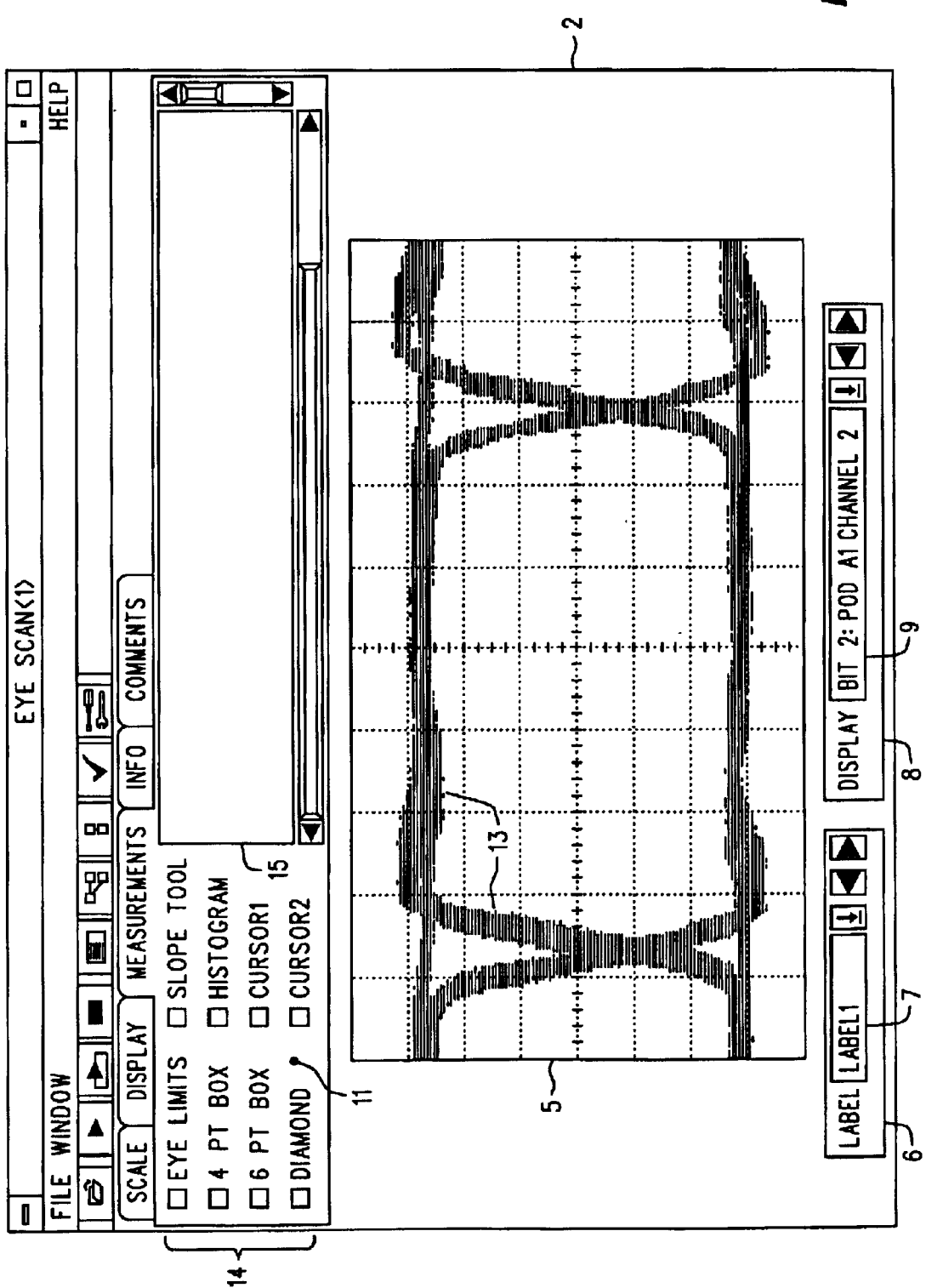
FIG. 2 is an eye diagram presentation similar to the one of FIG. 1, but showing upon a Measurements tab which on-screen eye diagram measurements are available.

To continue, refer now to FIG. 2, wherein the same eye diagram 13 is again shown in region 5. In this and the remaining figures, identical or substantially similar elements are assigned respective unchanging reference characters. What is different about FIG. 2, compared to FIG. 1, is that the operator has clicked on the MEASUREMENTS tab 11. Accordingly, the SCALE tab is now mostly obscured behind the MEASUREMENTS tab 14, which is now in front of all the other tabs. The MEASUREMENTS tab 11 shows eight check boxes 14 for several different types of (on-screen) measurements that can be performed (via post measurement processing of captured data) upon the eye diagram 13. It is these various measurements that are of interest to us in the balance of this Application. To invoke a measurement the operator clicks upon the box corresponding to that measurement. We shall say that a box has been checked (as though it contained a check mark, although in our figures a checked box is indicated by its being shown as filled in with a solid color and an unchecked box is "empty"). As many measurement boxes as desired can be checked at one time. Clicking on a checked box will "uncheck" it. Note also message area 15 on MEASUREMENTS tab 11; it will be used to report with text messages certain values associated with the measurements made.

Figure 3:
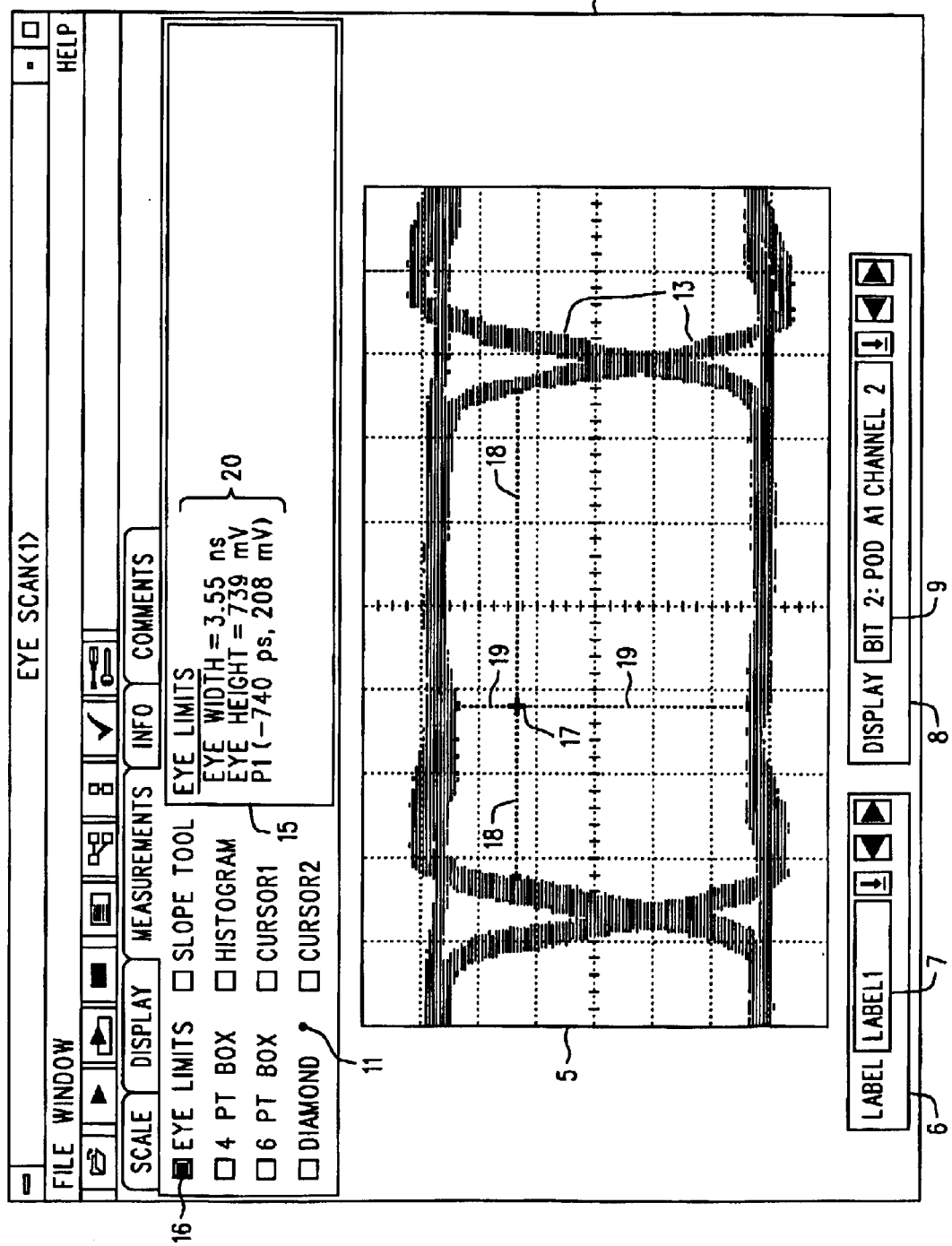
FIGS. 3, 4, 5 and 6 are eye diagram presentations illustrating an Eye Limits measurement.

In FIG. 3 the EYE LIMITS box 16 has been checked. The EYE LIMITS measurement is useful in characterizing the size of an eye opening at various locations within the eye diagram. A cursor icon 17 is automatically created and left at or near the center of the eye diagram 13. Using the mouse or other pointing device the operator can "grab" the cursor 17 by getting sufficiently close to it with the screen pointer and then depressing and holding a previously selected mouse button. Then the mouse is moved and the cursor 17 moves in concert to a desired location, whereupon it is left thereat by releasing the button. (This is, of course, essentially the "drag and drop" mechanism afforded by most commercial window manager software, and is conventional.) Associated with the cursor 17 are a horizontal line 18 and vertical line 19. These pass through the center of the cursor 17, and extend until they first encounter the trace that is the eye diagram 13, whereupon they terminate in a characteristic small rectangular block that is a shape not associated with any other measurement. This allows an EYE LIMITS measurement to be distinguished from other types of measurements when there are several in use at once.

It is possible to arrange that one of the lines originating at the cursor can be grabbed and moved (taking the cursor with it, also) without affecting the position of the other line. This seems reasonable, but in the end it was decided to not allow this. The reason is that, as we shall show, there can be a great many on-screen measurements in effect at the same time, and that many of them involve lines, and some of them can be coincident. Not only does this pose a question as to which line should be moved (i.e., which measurement is affected), but the operator finds the situation confusing and potentially irksome. The solution is to separate causes that have similar effects. Some measurements will be adjustable by individually dragging their associated lines, but not the EYE LIMITS measurement; only dragging its cursor adjusts its measurement location. It could be otherwise, but this is a reasonable and effective way of keeping a bag of snakes tied shut.

To continue with the EYE LIMITS measurement itself, the horizontal line 18 ascertains the "internal width" of the eye diagram 13 at the height of the cursor 17, while the vertical line 19 ascertains the "internal height" at the horizontal position of the cursor. Collectively, these measurements may be called the size of the "eye opening". Meanwhile, a text message 20 appears in message area 15, and reports the measured eye width, eye height, and location (called P1) of the cursor 17. In a preferred embodiment the reported values correspond to the locations on the eye diagram 13 where the lines extended from the cursor 17 first encounter the eye diagram. It could be otherwise. For example, the location of the encounter could be taken as some sort of mean value based on the width of the trace at the location of the intersection. This gets fussy when it is remembered that extremes of the trace width probably represent less frequent occurrences than do the middle section. (For example, the trace might change color across its width.) So one would have to specify what type of mean value was desired. In any event, the difference in reported values for the mean and the first encountered value is probably small, and might not be worth the extra effort. Besides, it is anticipated that the principal use of the EYE LIMITS measurement is to discover information describing worst case or minimum guarantees of performance. Saying what it did "on average" is not the same thing as saying that "It always does at least this . . . ", or "It never does that . . . ". So, for these reasons, while agreeing that it could be otherwise, we have set up the EYE LIMITS measurement to operate on "first encountered" data, as described.

We shall have more to say in due course about how it is that such measurements can be performed. Before we examine that topic, however, it is perhaps more efficient to describe the nature of the other on-screen measurements, so that the explanation, when it is given, can apply to them all. For now it is sufficient to simply note that this is a post data acquisition measurement, the acquired data is contained in one or more data structures, that the correspondence between entries in those data structures and the location of the cursor 17 is known, and the relationships of interest between the data at those entries can be discovered.

Figure 4:
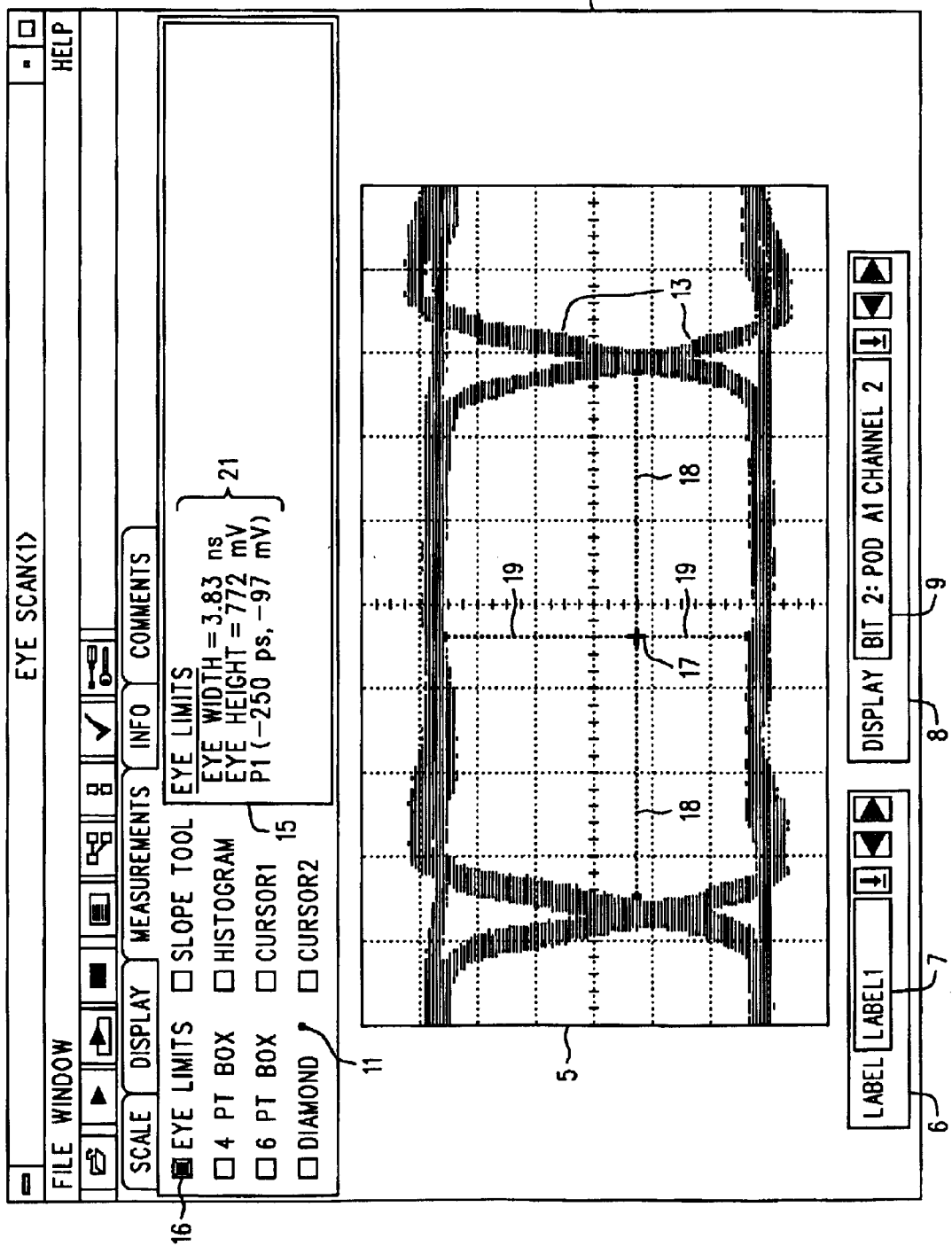

FIG. 4 illustrates that the cursor 17 can be re-positioned to another location within the eye diagram 13. Note that the text messages 21 in message region 15 report different values for the measured eye limits and the location of cursor 17, as compared to FIG. 3.

Figure 5:
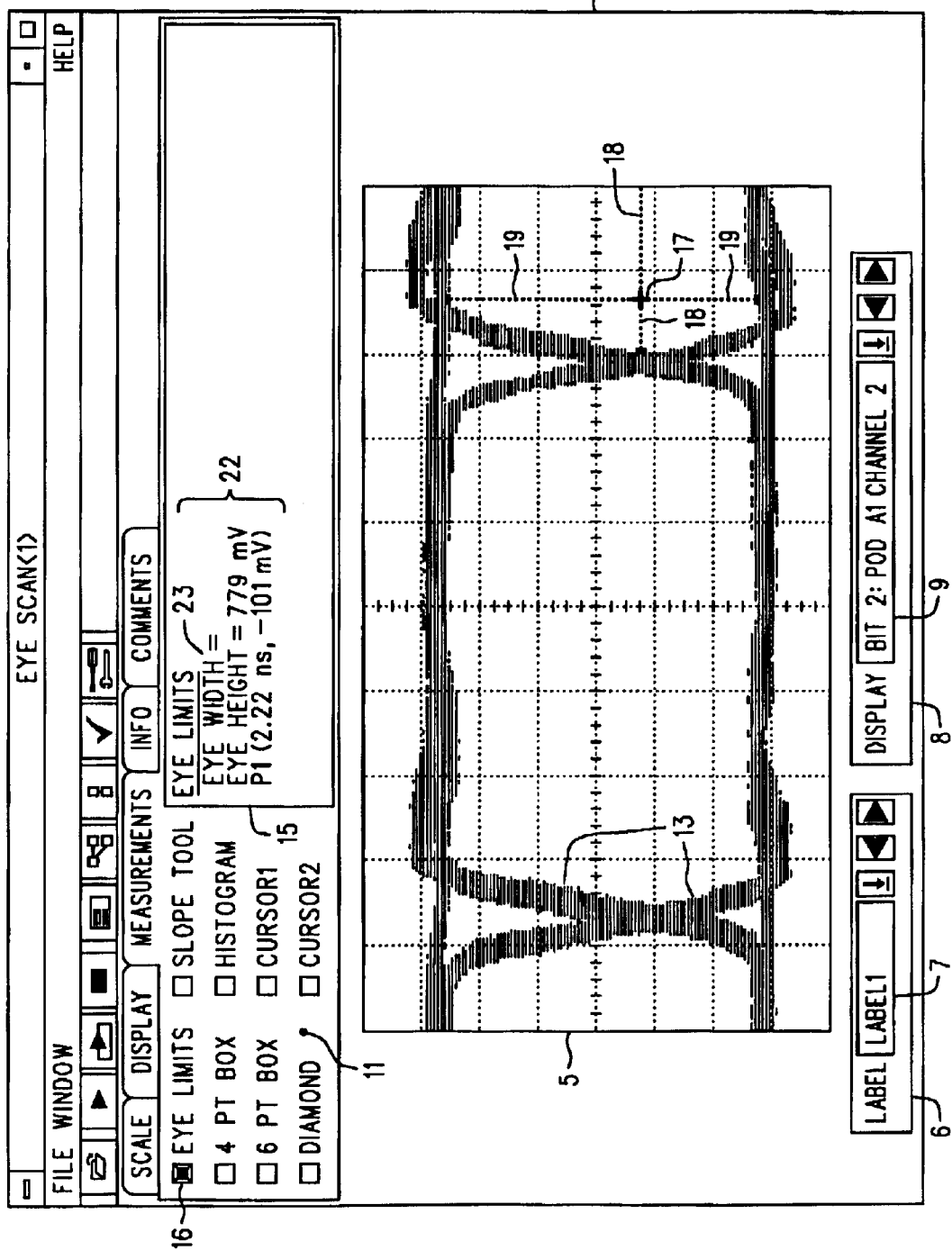
Figure 6:
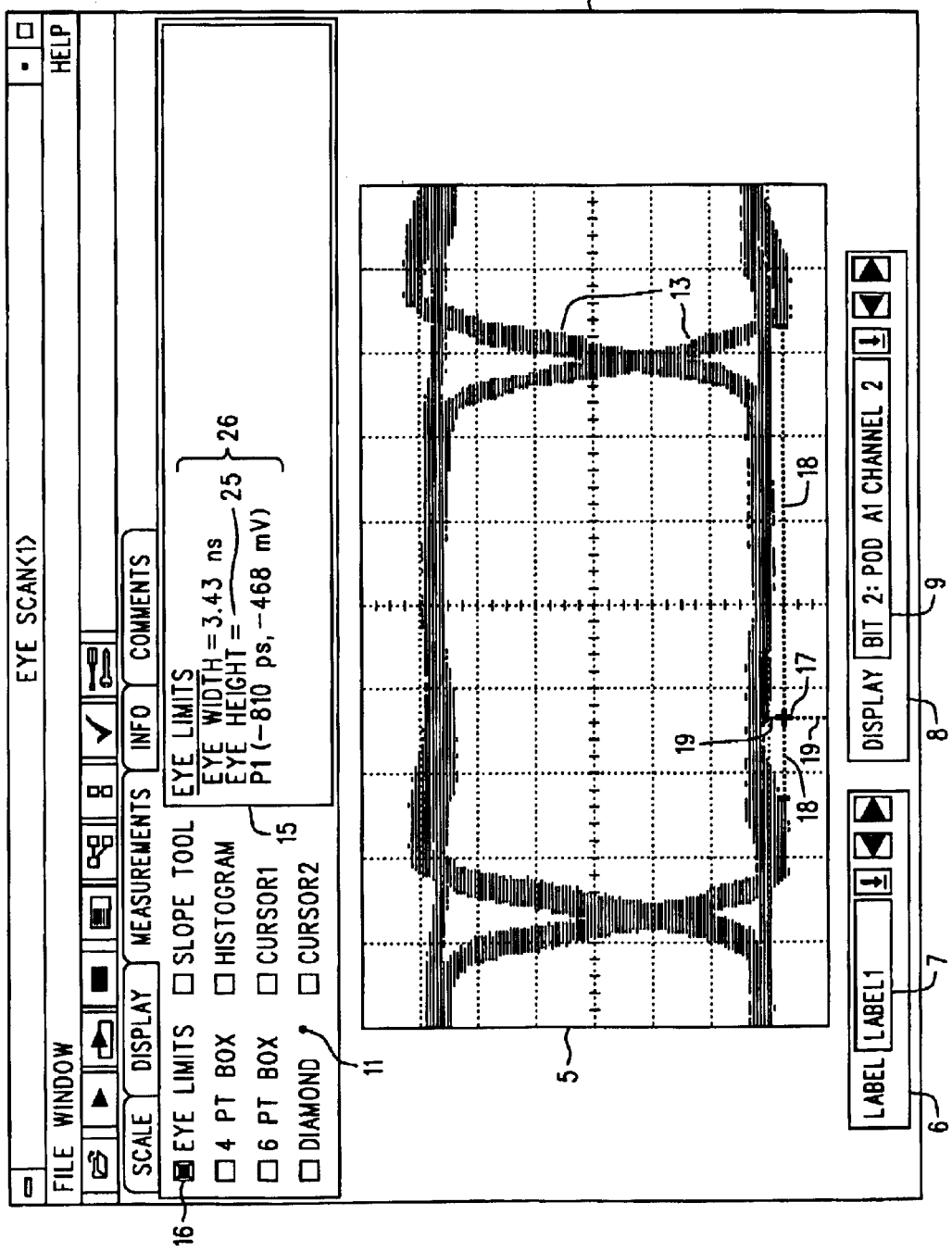

Now note FIGS. 5 and 6. These each involve placing the cursor 17 at a location that is not entirely enclosed by the displayed eye diagram 13. Nevertheless, there can be legitimate reasons for wanting to do such a thing, although there arise some further considerations that we now discuss. In the case of FIG. 5 the cursor 17 might or might not be at a location that is "really" inside an eye. (It would seem that the eye cycle containing the cursor 17 has a left-hand edge, but not a right-hand edge.) To appreciate this one should know that the cursor 17 of FIG. 5 might be just as "inside" as it is in FIG. 4, and would indeed appear so were it not for the operator having "zoomed in" by selecting a different time resolution for display of the measured results. That is, the "real" eye diagram might have many eye cycles, and the cursor 17 is indeed inside one of them. On the other hand, perhaps presentation of FIG. 5 is already fully zoomed out, and there is no right-hand edge to associate with the left-hand one. We can tell that this is indeed the case by looking at the text 22 reported in message area 15. Legend 23 "EYE WIDTH =" is without a non-blank value. This alerts us that at least one side of horizontal line 18 (as defined by the cursor 17) fails to encounter the eye diagram's data during an examination of its data structure. If a re-zoomed presentation would show cursor 17 fully enclosed, then legend 23 would indeed have a numerical value.

The situation in FIG. 6 is similar, but with two significant differences. First, notice that each segment of line 18 (starting from the cursor 17), does encounter the eye diagram, although it might also be the case that only one segment does, or that neither does, depending on the shape of the eye diagram and the location of the cursor 17. For the case shown, there is a definite eye width. Second, notice that the cursor is definitely not fully enclosed by the eye diagram 13. The cursor is positioned sufficiently below (it could have been sufficiently above) the eye diagram 13 that one segment of vertical line 19 (again, taking cursor 17 as the starting point) will fail to intersect the data for the eye diagram 13. This is not surprising, since we appreciate that while an eye diagram presentation can be a portion of a cycle or many cycles in length, there is no construct that corresponds to one eye diagram (with its own voltage reference—i.e., ground)

being above or below another (completely separate eye diagram) that also has its own reference. Say, for example, and after the fashion of a dual trace oscilloscope where the vertical position controls have been adjusted to make ground for each channel be on a separate horizontal graticule line, the vertical space between traces has no measurement significance. (However, see the next paragraph . . . ) In any event, for the case shown in FIG. 6, the text legends 26 reported in message area 15 include a legend 25 "EYE HEIGHT=" that has no non-blank value (i.e., it is blank).

That said, we must admit that there are ways to obtain eye diagrams that appear as one above the other, or even one within the other. Suppose, for example, that a data signal had a two volt excursion for a while and then exhibited a period of five volt excursions. Or these different excursions could be cleanly intermingled, on a cycle by cycle basis. The result would appear to be a presentation having eye cycles within eye cycles. Likewise, the right DC offsets could come and go to produce what seemed to be separate traces, one above the other. Such signal behavior would likely be thought bizarre, but it would nevertheless produce the results described. However, if it did, then it must be remembered that, despite appearances, the result is still one eye diagram presentation that merely seems to be more than one, owing to a bifurcated trace. And there is yet another legitimate way these peculiar results can be obtained. Suppose that a composite eye diagram were being formed, and the individual components had significantly different voltage levels or degrees of excursion. Then the composite would be one eye diagram that had this "bifurcated trace" property. The point to be made here is that if the eye diagram at hand has one of these "bifurcations" as described in this paragraph, then the EYE LIMITS measurement does work as expected. Which is to say, if the line segment extended from the cursor encounters an edge or side of an eye, an associated non-blank value is reported in the message area 15; otherwise, a blank value is reported.

Figure 7:
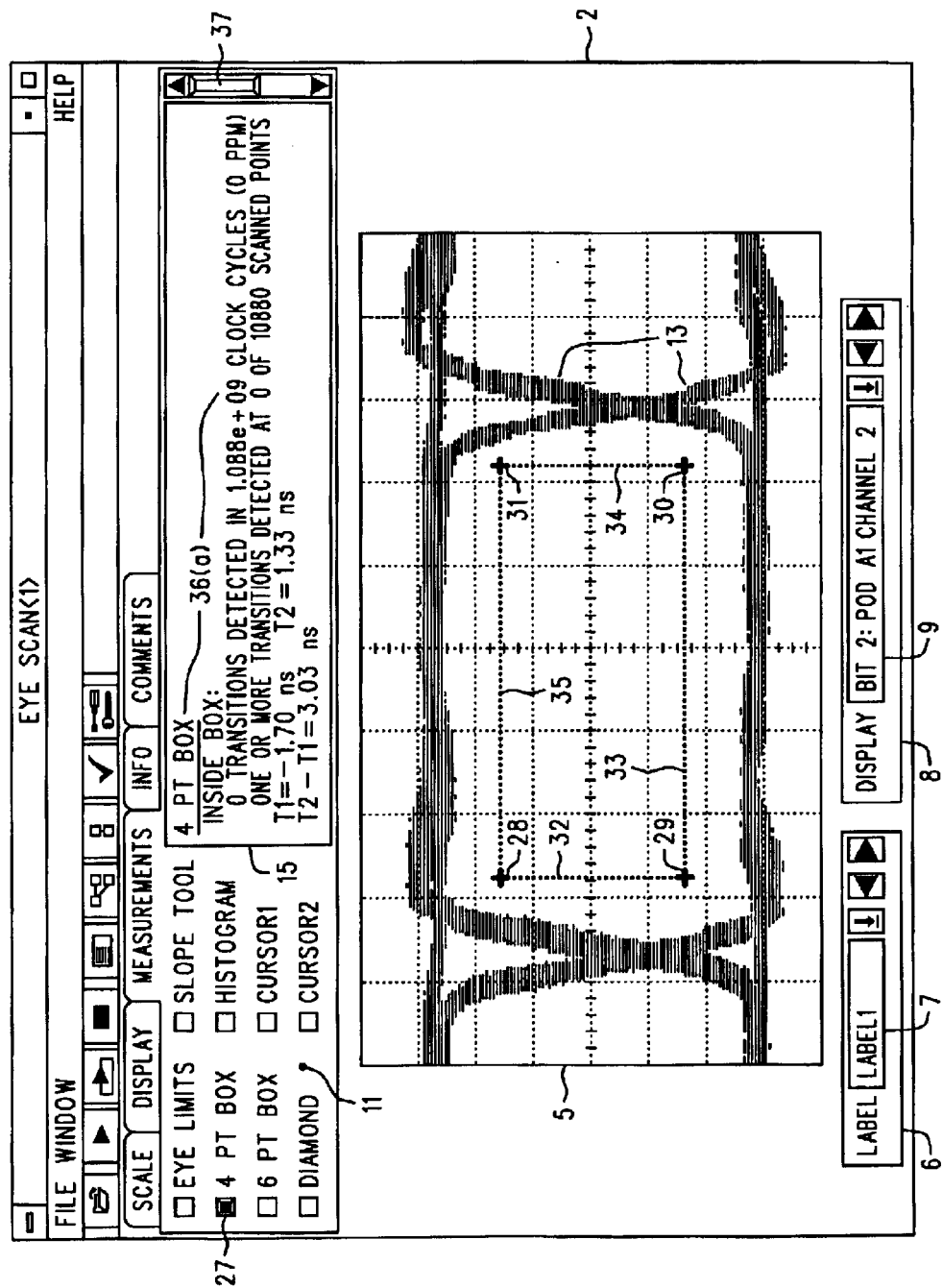
FIGS. 7, 8 and 9 are eye diagram presentations illustrating a Four Point Box measurement.

We turn now to FIG. 7 and on-screen eye diagram measurements made with a four point box. By a four point box we mean a rectangle whose sides will be parallel to the X and Y (time and voltage, respectively) axes of the eye diagram 13. The four point box measurement is begun by clicking on the associated check box 27. As with the EYE LIMITS measurement, an indicated measurement at an automatically chosen preliminary location appears on the screen, along with reported text 36(*a*) in the message area 15 for associated measured values. In this case a rectangular (four point) box appears, comprising points 28-31 (indicated by cross-shaped cursors) and the connecting line segments 32-35. The text 36(*a*) is too much to fit in message 15 all at once, so a vertical scroll bar 37 appears to allow access to the rest of the reported data 36(*b*); see FIG. 8, where the scroll bar 37 has been moved downward by dragging it with the mouse.

If the four point box is not of the right size, shape or location, those properties can be changed as follows. By clicking on a location of one of the four lines (32-35) sufficiently distant from one of the corners (28-31), the entire box can be dragged to a new location without resizing. The box is resized by clicking on a corner point and dragging it to a new location. The vertical and horizontal lines through the dragged corner point will remain vertical and horizontal, respectively, and the locations of the adjacent corners and the lengths of all four lines will be adjusted as needed to properly form the box. In any event, the horizontal lines of the box remain parallel to the time axis and the vertical lines remain parallel to the voltage axis.

The system will prevent any attempt to "turn the four point box over" by interchanging the left-right relationship of points 28 and 31 (or 29 and 30) or the above-below relationship of points 29 and 28 (or of 30 and 31). Likewise, it will prevent an attempt to make lines 32 and 34 be co-incident, or lines 33 and 35 to be co-incident. It does this by enforcing a minimum distance between such points and lines (say, a tenth of a volt in the vertical direction, and a comparable amount in the horizontal direction). So, for example, as line 32 is dragged to approach line 34 from the left, once the minimum distance is reached line 34 automatically begins to move in parallel with line 32.

Message area 15 includes the following information (36a-b) for a four point box measurement. First, it indicates the number of times that any points belonging to the eye diagram 13 fell on or within the box, as well as the number of points scanned over how many clock cycles to create the eye diagram. It then indicates the time values represented by the locations of the left and right ends of the four point box and the duration of time corresponding to the width of the four point box. Then is reported the voltage values represented by the locations of the top and bottom sides of the four point box and the excursion in voltage corresponding to the height of the four point box. Then, finally, the individual (Time, Voltage) coordinates of the four corner points are reported.

Figure 8:
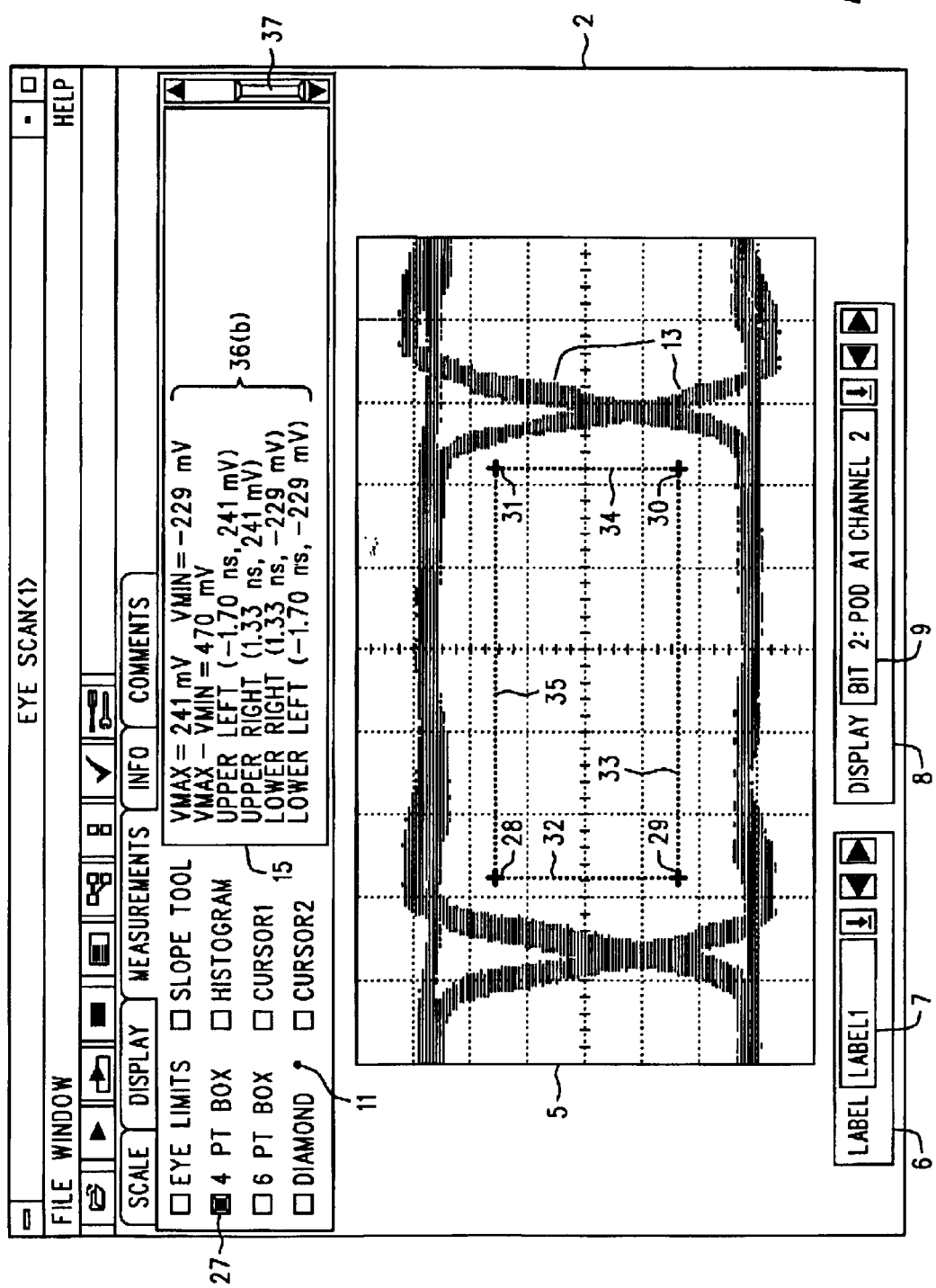
Figure 9:
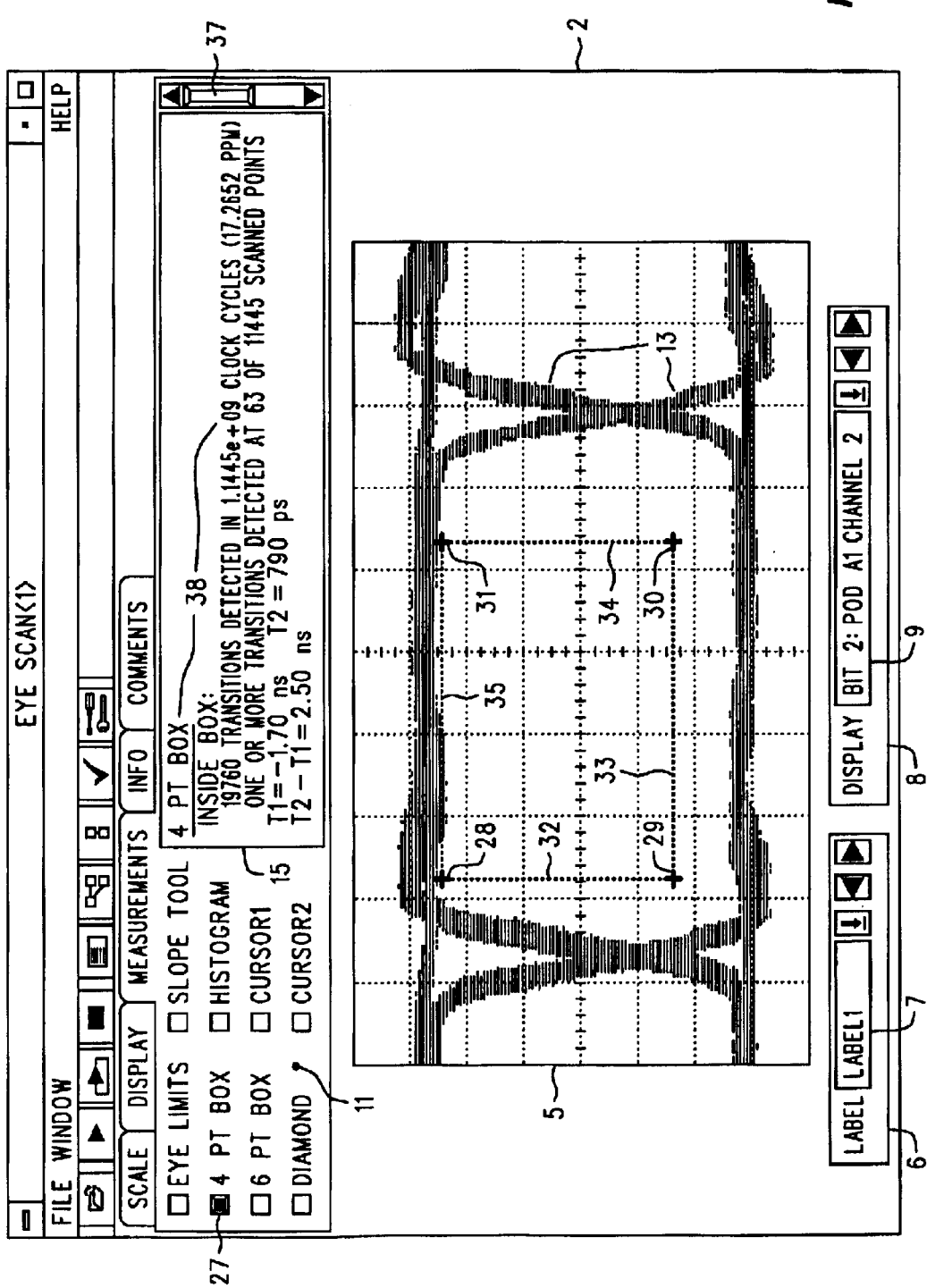

FIG. 9 is similar to FIG. 8, except that the location of the four point box has been moved upward to encounter the upper portion of the eye diagram 13. Note now that reported text 38 in message area 15 indicates that there are some transitions detected within the four point box.

Figure 10:
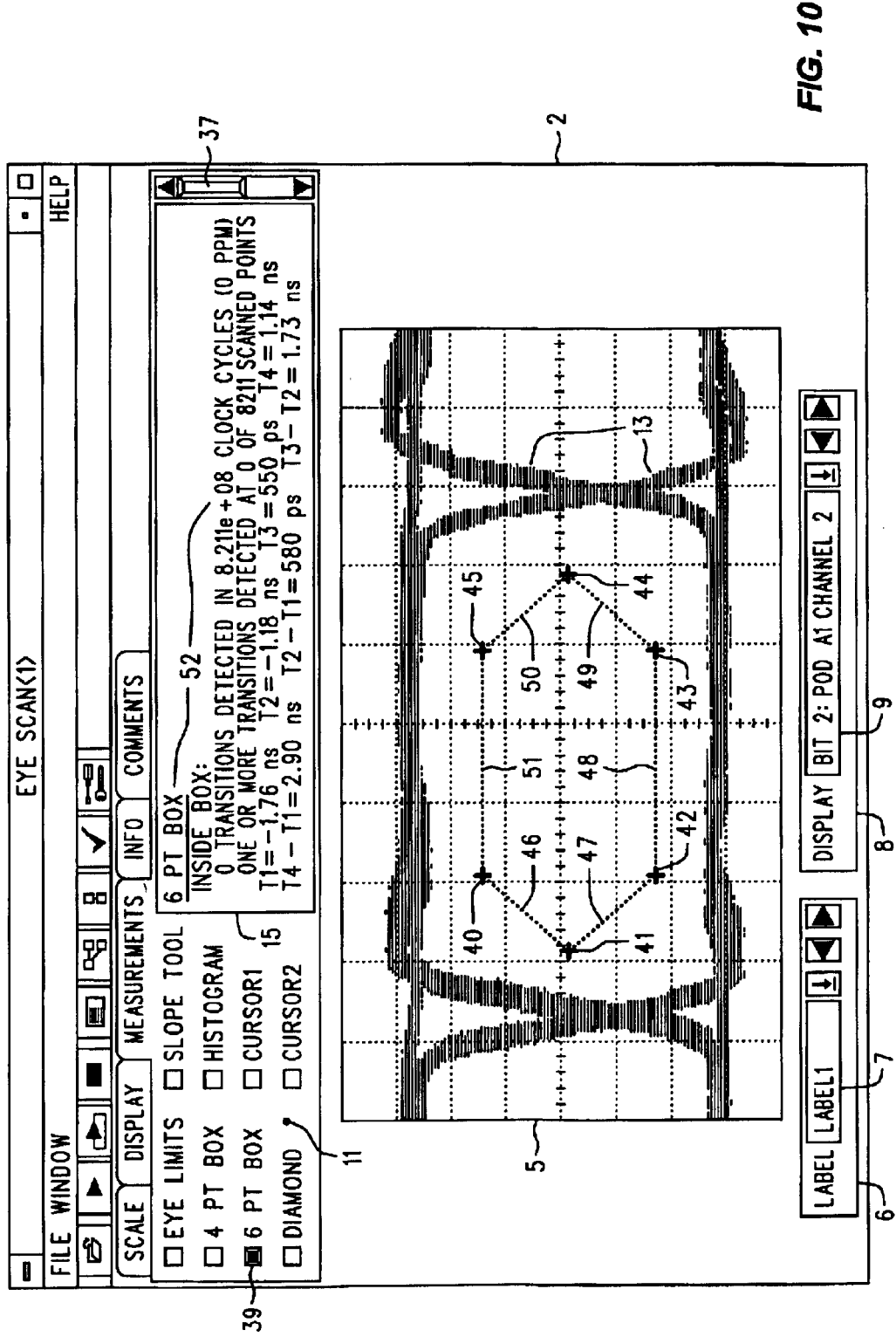
FIGS. 10 and 11 are eye diagram presentations illustrating a Six Point Box measurement.

Refer now to FIG. 10, wherein is depicted a six point box on-screen measurement, that in many ways is very similar to the four point box measurement. The six point box measurement is begun by clicking on box 39. A six point box defined by points 40-45 and intervening lines 46-51 automatically appears. As with the four point box, the location of the entire six point box can be altered without resizing by dragging a point on the interior of one of the lines forming a side. Dragging individual vertices of the six point box works like this. Points 40 and 45 are linked to move in unison vertically, as are points 42 and 43. In both cases, moving one point will also move its partner. In a similar fashion, points 42 and 40 are linked to move in unison horizontally, as are points 43 and 45. In further similarity to the four point box, the system will prevent any attempt to turn the six point box over or make opposing line segments be coincident. It does this by again enforcing the minimum distance. In fact, the outside four vertices 40, 42, 43 and 45 of the six point box are treated by the system in exactly the same way as are the four vertices of a four point box.

One difference between the four and six point boxes involves the "midpoints" 41 and 44. Although it might have been implemented otherwise, testing with users indicated a preference for enforcing the relationship that the vertical positions of points 41 and 42 be midway between points 40/42 and 45/43, respectively. Thus, for example, if point 40 is moved up or down, then at least one of points 41 and 42 must be automatically adjusted in concert. To preserve the same rules for the outer corners as are used for the four point box, point 42 stays put and point 41 is adjusted to be at mid-height. Points 41 and 44 are linked so as to move up and down together, and will always be at the same height. Each may be moved horizontally, but its partner will automatically be moved by an equal amount in the opposite direction. Furthermore, a midpoint (41 or 44) can be moved toward the middle of the six point box only to that location that forms a rectangle with the outer corners (40, 42, 43 and 45).

Reported text 52 in message area 15 is similar to that for the four point boxes of FIGS. 7, 8 and 9; it just involves more vertices and intervening lines.

Figure 11:
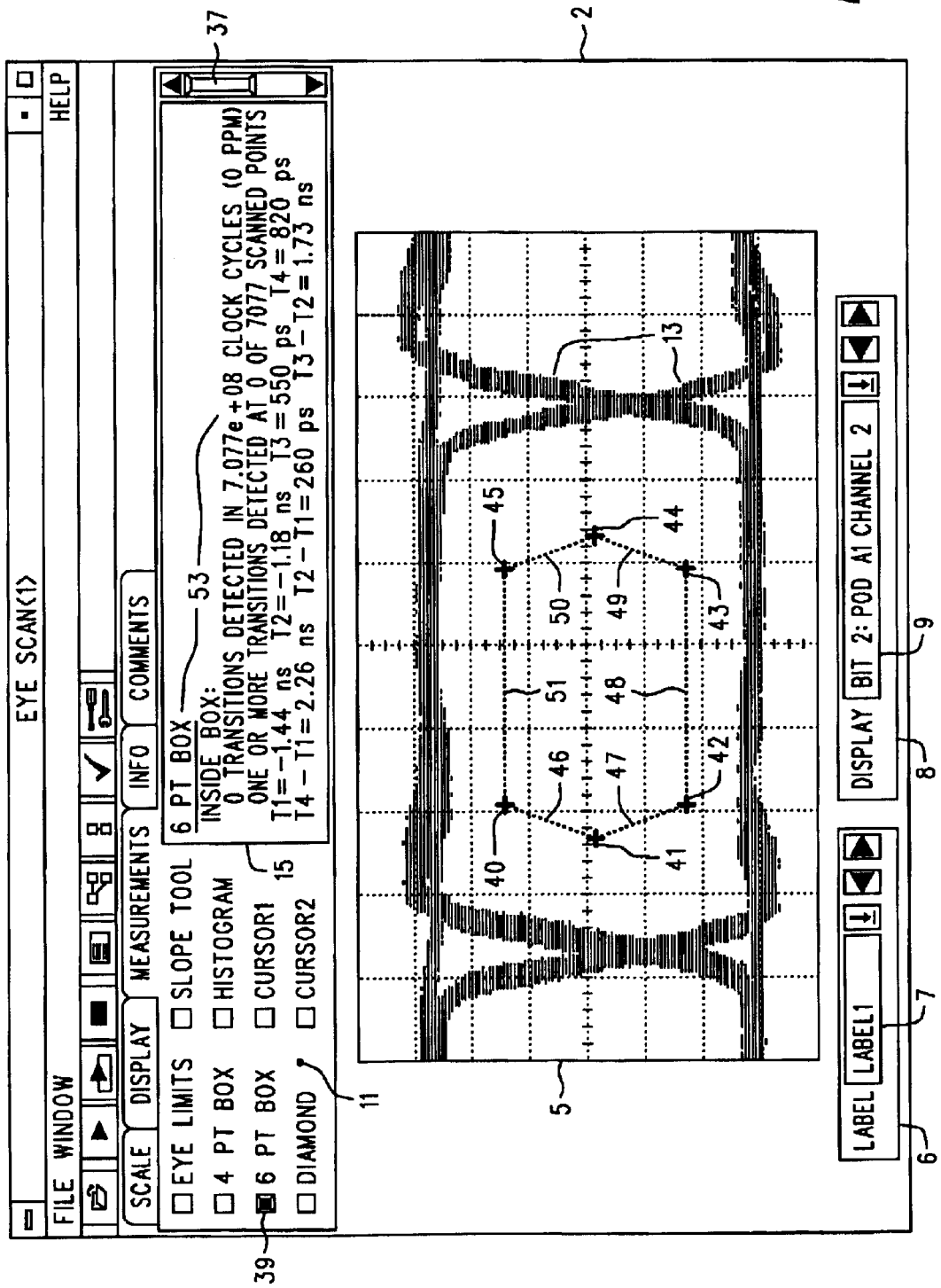

FIG. 11 is similar to FIG. 10; it is another six point box on-screen measurement. The difference is that the shape of the six point box has been changed to make it less wide. This difference is reflected by different text 53 in message area 15.

Figure 12:
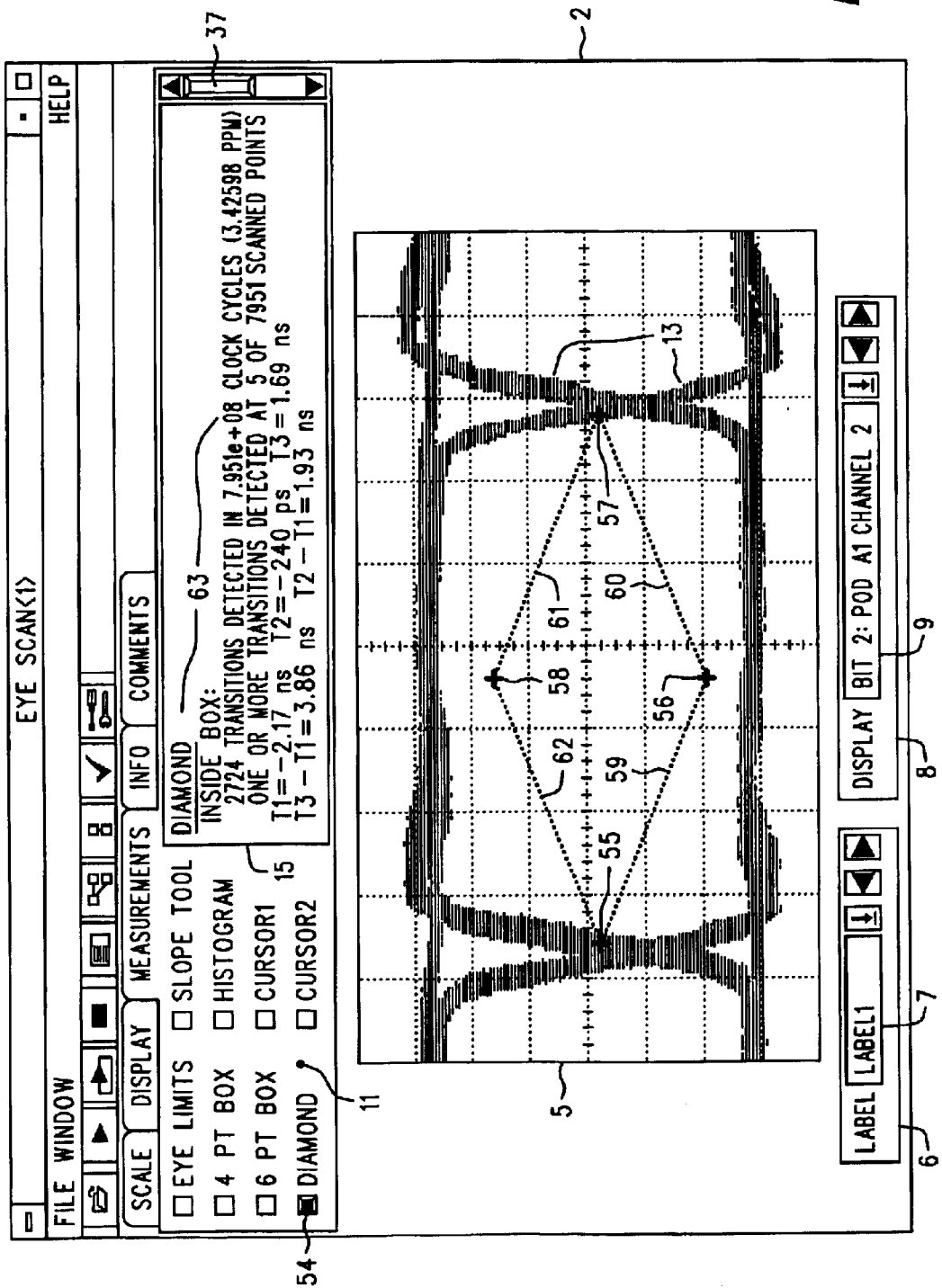
FIG. 12 is an eye diagram presentation illustrating a Diamond measurement.

Refer now to FIG. 12, which depicts an on-screen measurement using four points and their connecting line segments, all in the shape of a diamond. In particular, the diamond measurement is initiated by checking box 54, whereupon the four points 55-58 and their interconnecting lines 59-62 are initially automatically placed in the displayed image (5). The difference between the diamond on-screen measurement and the four and six point box on-screen measurements is essentially the shape of the figure defined by the points, and that the top and bottom vertices 56 and 58 behave as "outside corners" while side vertices 55 and 57 behave as "midpoints". Otherwise, they all work in the same manner. So, dragging an interior point along an interconnecting line (59-62) relocates the entire diamond, while dragging one of vertices 56 and 58 horizontally drags the other with it, while each can be independently moved in the vertical direction. Likewise, dragging one of vertices 55 and 57 horizontally drags the other with it by an equal amount in the opposite direction, while each is automatically moved in the vertical direction to remain at mid-height in response to vertical movement of vertices 56 and 58. Vertices 55 and 57 cannot otherwise be vertically adjusted. Furthermore, the minimum distance requirement is enforced, so that the diamond cannot be turned over or collapsed into a line or a point, but will remain at least a small diamond.

The reported text 63 in the message area 15 is similar in nature to that for the four and six point boxes.

Figure 13:
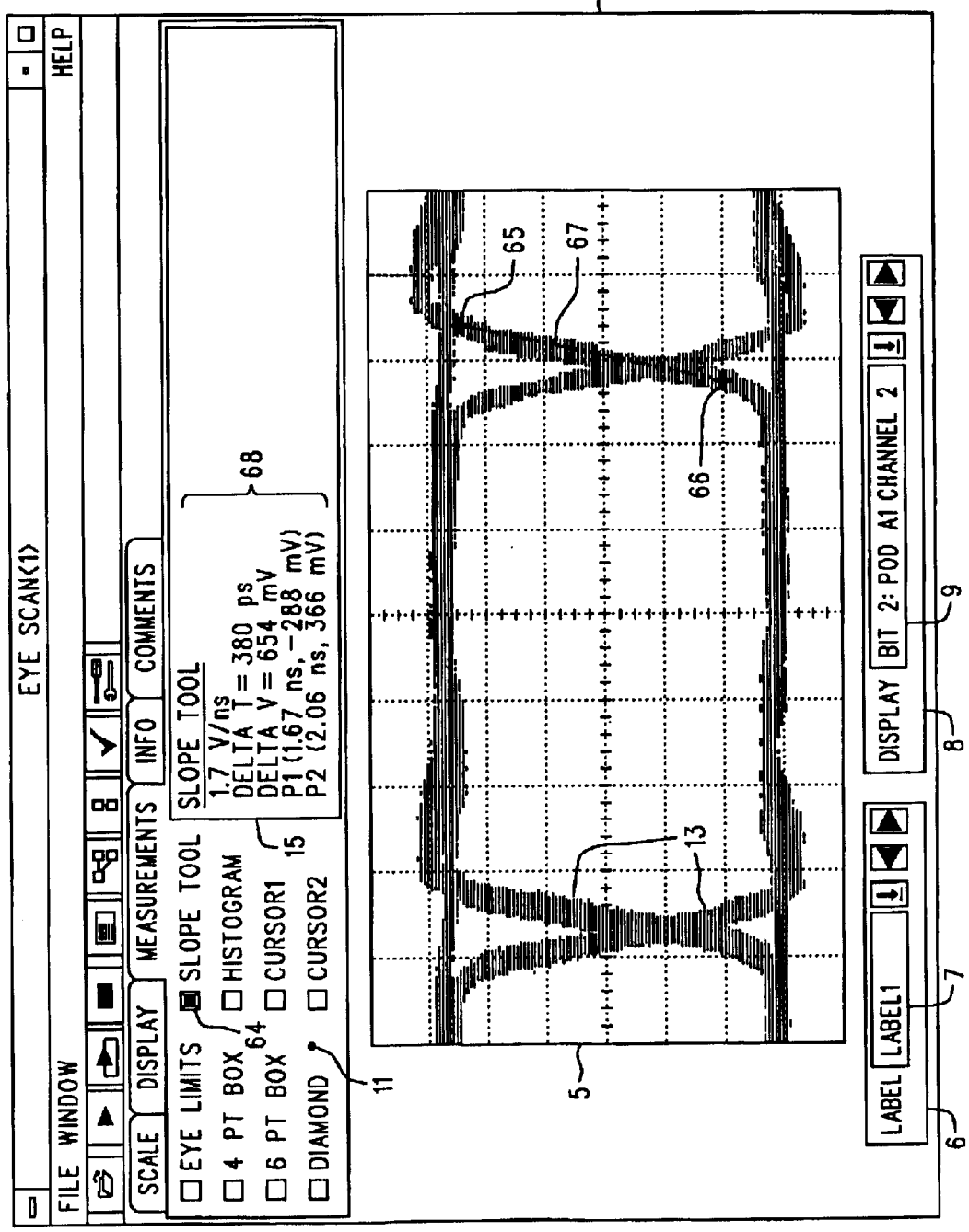
FIGS. 13, 14 and 15 are eye diagram presentations illustrating a Slope measurement.
Figure 14:
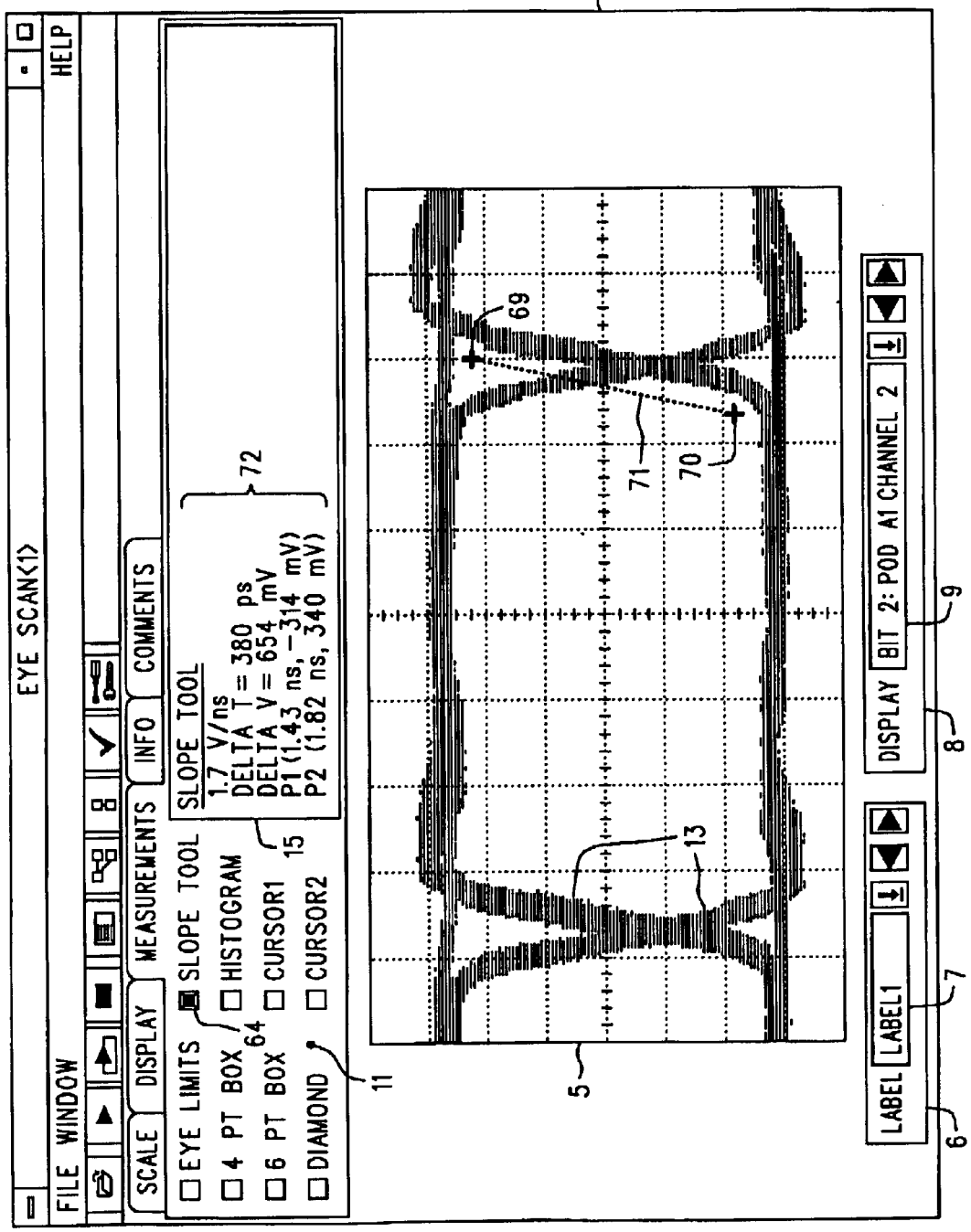

Refer now to FIG. 13, wherein is depicted a use of the on-screen SLOPE measurement tool. It is invoked by clicking on box 64, whereupon two points 65 and 66 along with the connecting line 67 are automatically placed (as if arbitrarily) into the displayed image 5. Points 65 (P2) and 66 (P1) can then be individually positioned in desired locations by dragging, which is the situation shown in FIG. 13. Note the text 68 in message area 15. It reports the slewing rate (1.7 Vms) as well as other useful information;

As with others of the on-screen measurement tools, line 67 can be grabbed and dragged to a different location, without otherwise changing its slope. See FIG. 14, where line 67 becomes line 71 between points 70 and 69, after having been dragged to different horizontal and vertical locations. Note, for example, that the text 72 reports P1 and P2 as changed, while the slope remains the same.

Figure 15:
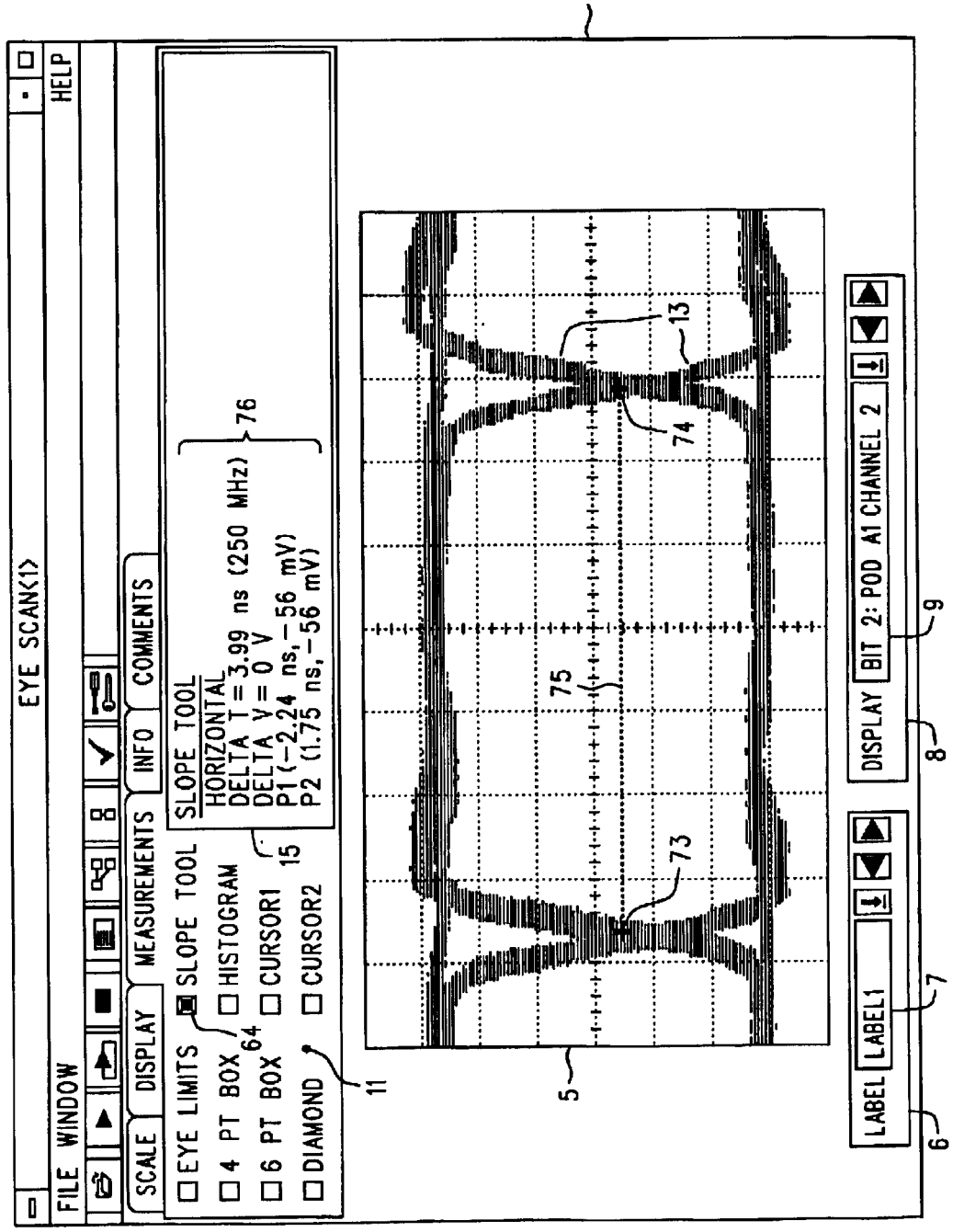

Refer now to FIG. 15, where is shown yet another SLOPE tool example. In this example the end points 73 and 74 of line 75 have been positioned over the probable or expected data signal zero crossings. The measured slope is, as expected, essentially zero, and the measured time interval matches a "cardinal frequency". Observe the reported text in message area 15. Note that the legend "HORIZONTAL" is displayed, and that the reported measurement DELTA T=3.99 ns is accompanied by the legend "(250 MHZ)". These additional legends are presented as a convenience for the operator, according to the following rules. A stewing rate of 100V/ns or more generates the additional legend "VERTICAL", while one of 1 uV/ns or less generates the additional legend "HORIZONTAL". Frequency legends are only generated if the SLOPE tool is essentially horizontal (e.g., if the slope for the tool is 0.5V/ns) and the frequency would be less than 2 GHz ($\Delta T \leq 500$ ps). If the frequency value to be shown is greater than 500 MHZ then it is rounded to the nearest 10 MHZ, else it is rounded to the nearest 1 MHZ. The astute reader will notice that perhaps the frequency indicated in FIG. 14 ought to be 251 MHZ instead of 250 MHZ, but this is not so. In this example the 3.99 ns was rounded down from an internal value, from which the 250 MHZ is indeed the correct rounded value. This is not an error, but a well understood artifact of fixed precision arithmetic.

This business of indicating in the message area 15 the conditions of VERTICAL, HORIZONTAL and the frequency, could be incorporated into other on-screen measurement tools besides the SLOPE tool, although in this preferred embodiment we have elected not to do so.

Now note the series of FIGS. 16-27, all of which deal with the creation of on-screen HISTOGRAM measurements. An eye diagram is formed relative to a periodically recurring reference point in time; say, an edge of a system clock signal. The on-screen HISTOGRAM measurement plots the number of hits occurring at a selected voltage along a time interval defined relative to the reference point (a "horizontal slice" of the eye diagram), the number of hits occurring within a voltage range of interest at a point in time defined relative to the reference point (a "vertical slice"), or, the number of hits occurring along a "tilted slice" (voltage and time vary together linearly). The result is a graph (the actual histogram, e.g., 83 in FIGS. 17-19) that is presented to the left of the display region 5. Certain other useful information is also reported in the message region 15, and in another area 84 below the histogram and called the HISTOGRAM cursor area.

Figure 16:
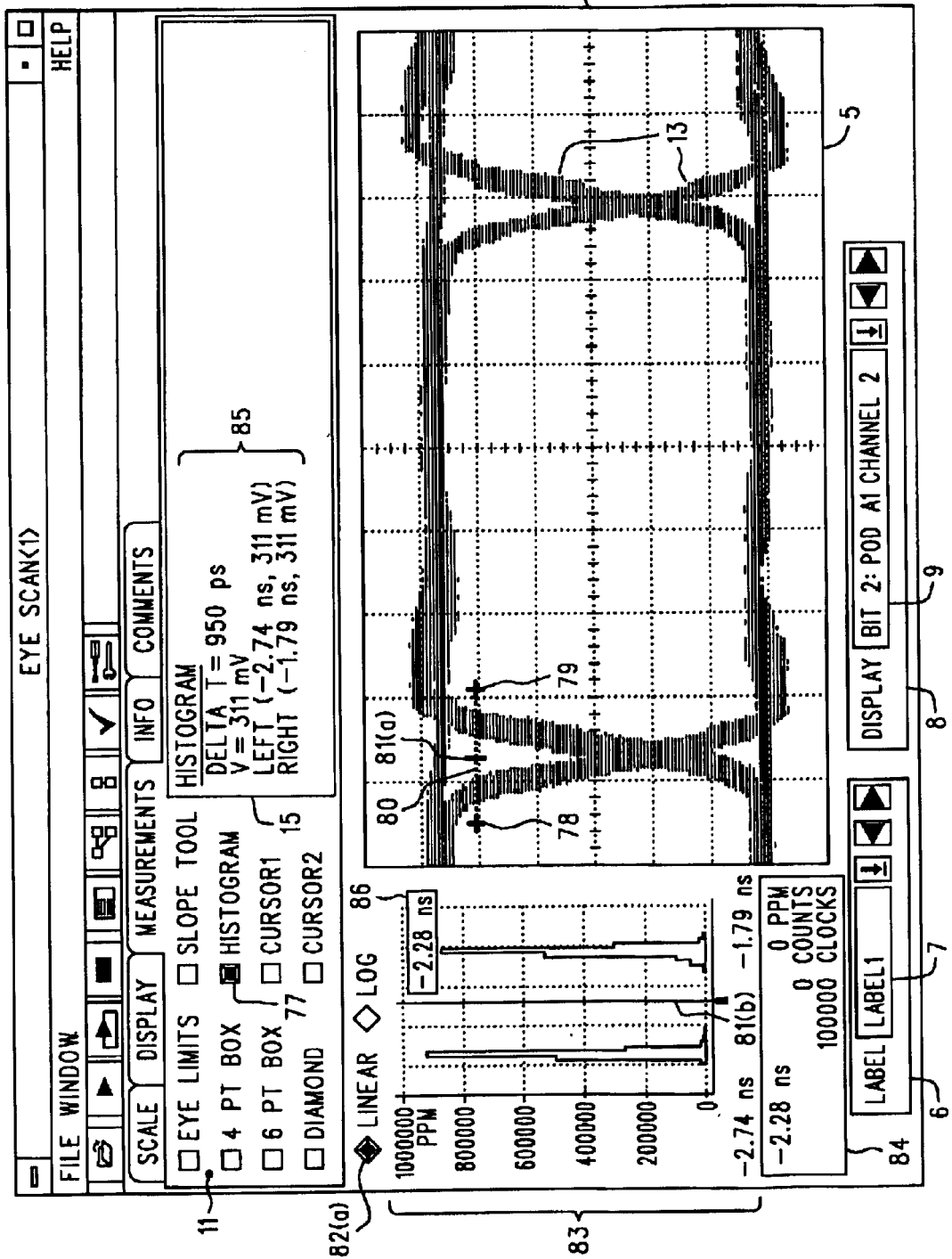
FIGS. 16, 17, 18, 19, 20, 21, 22, 23, 24, 25, 26 and 27 are eye diagram presentations illustrating a Histogram measurement.

With particular reference to FIG. 16, an on-screen HISTOGRAM measurement is begun by checking box 77 on the MEASUREMENTS tab 11. There automatically appears on the eye diagram 13 two end points 78 and 79 connected by an intervening horizontal line 80 (the horizontal slice) upon which is disposed a locator icon 81(*a*). The length and horizontal position of line 80 defines the time interval associated with the on-screen HISTOGRAM measurement, while its vertical position defines a selected (and thence unchanging) voltage of interest. Line 80 is subsequently resized and repositioned to reflect the particular on-screen HISTOGRAM measurement the operator intends to make. This is done by some combination of the following operations. First, the entire line 80 may be relocated simply by grabbing an interior point thereof and dragging the line 80 in any direction to the desired location. Either of the endpoints 78 and 79 may be grabbed and moved individually to either change the length or the location of the line 80;

For whatever size and location of line 80 that is in effect, the system produces the appropriate histogram 83. Its vertical axis is in units of PPM (Parts Per Million), while the horizontal axis is time from one end of the defined time interval to the other. Note that the axes are annotated with these values. In FIG. 16 the vertical axis is presented linearly, in accordance with box 82(*a*) having been checked. To skip ahead briefly, note from FIG. 19 (which is otherwise the same as FIG. 16) that the vertical axis of the histogram 83 could also be a logarithmic one if box 82(*b*) were checked instead of box 82(*a*).

Despite having been annotated, the horizontal time axis of the histogram 83 is almost certainly awkward to read: the time values of the endpoints 78 and 79 are quite arbitrary, the length of the time interval therebetween is not constrained to be a handy multiple of some nice integral value, and in any event, too many graticule lines add confusion. Yet we would still like to accurately know the time along the histogram's time axis. The solution is to incorporate a locator cursor 81(a) on the line 80 that has a counterpart 81(b) along the time axis of the histogram 83 and extending vertically over the entire extent of the vertical axis. The two locator cursors 81(a) and 81(b) move together; grabbing one and dragging it to a new location (constrained to remain within the time interval defined by endpoints 78 and 79) also automatically moves the other. The actual time value along the time axis represented by the locator cursors 81 is indicated in box 86.

Box 84 is the HISTOGRAM cursor area. It reports (again) the time value of the locator cursors 81, in addition to a digital (i.e., as text) indication of the value of the histogram at the time location of the cursors 81. The histogram value is given in both PPM and the actual count, and is also accompanied by the number of clocks associated with the eye diagram 13.

Finally, the message area 15 reports the particulars 85 about the size and location of line 80: the voltage, the time values of the endpoints 78 and 79, as well as their difference.

To conclude our discussion of FIG. 16, note that the trace of the eye diagram 13 intersects line 80 in two regions. Correspondingly, the histogram 83 has two peaks.

A Histogram measurement having a horizontal slice (as in FIGS. 16-24) can be useful in characterizing jitter along the time axis for the signal represented in the eye diagram.

Figure 17:
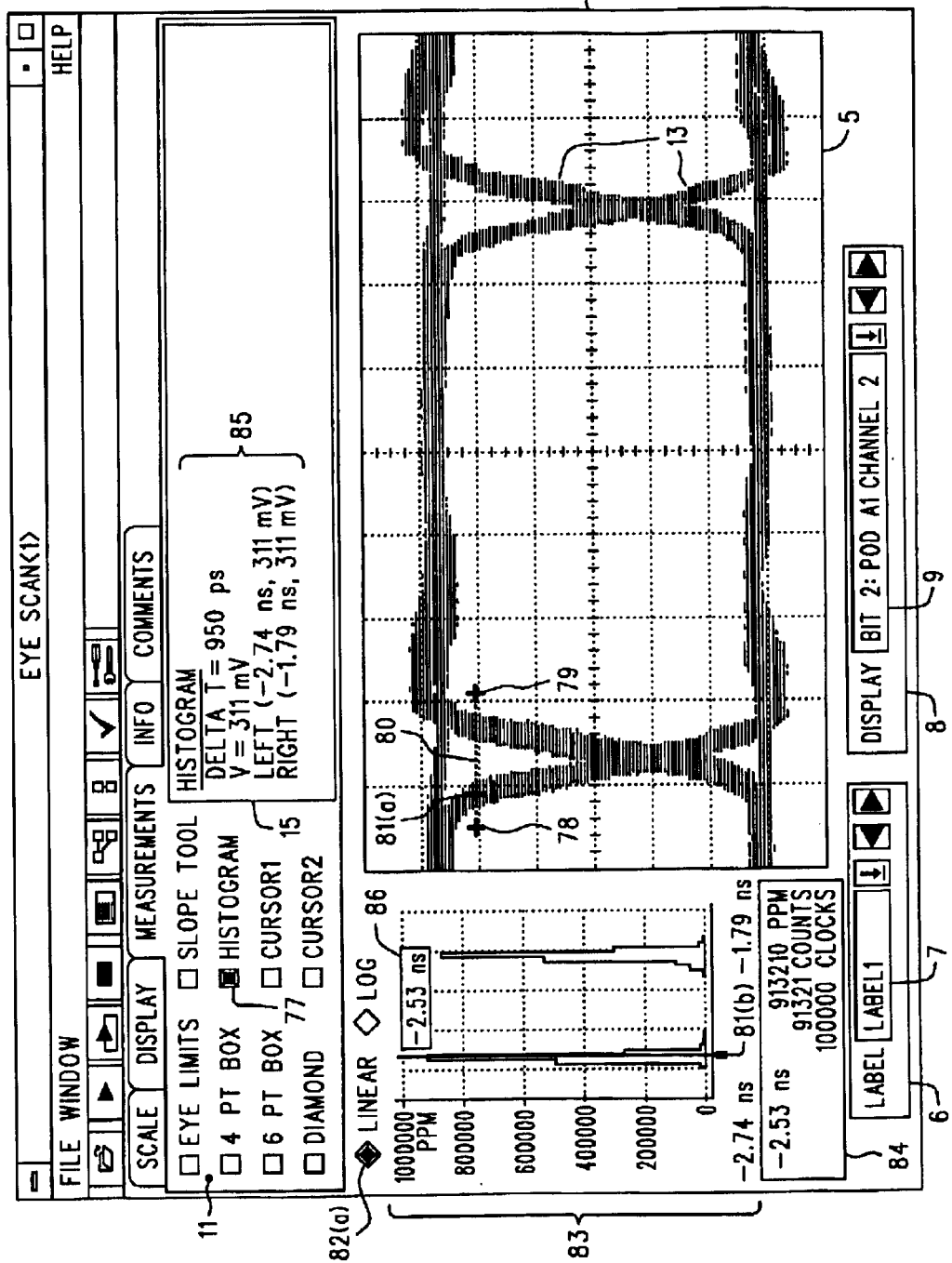
Figure 18:
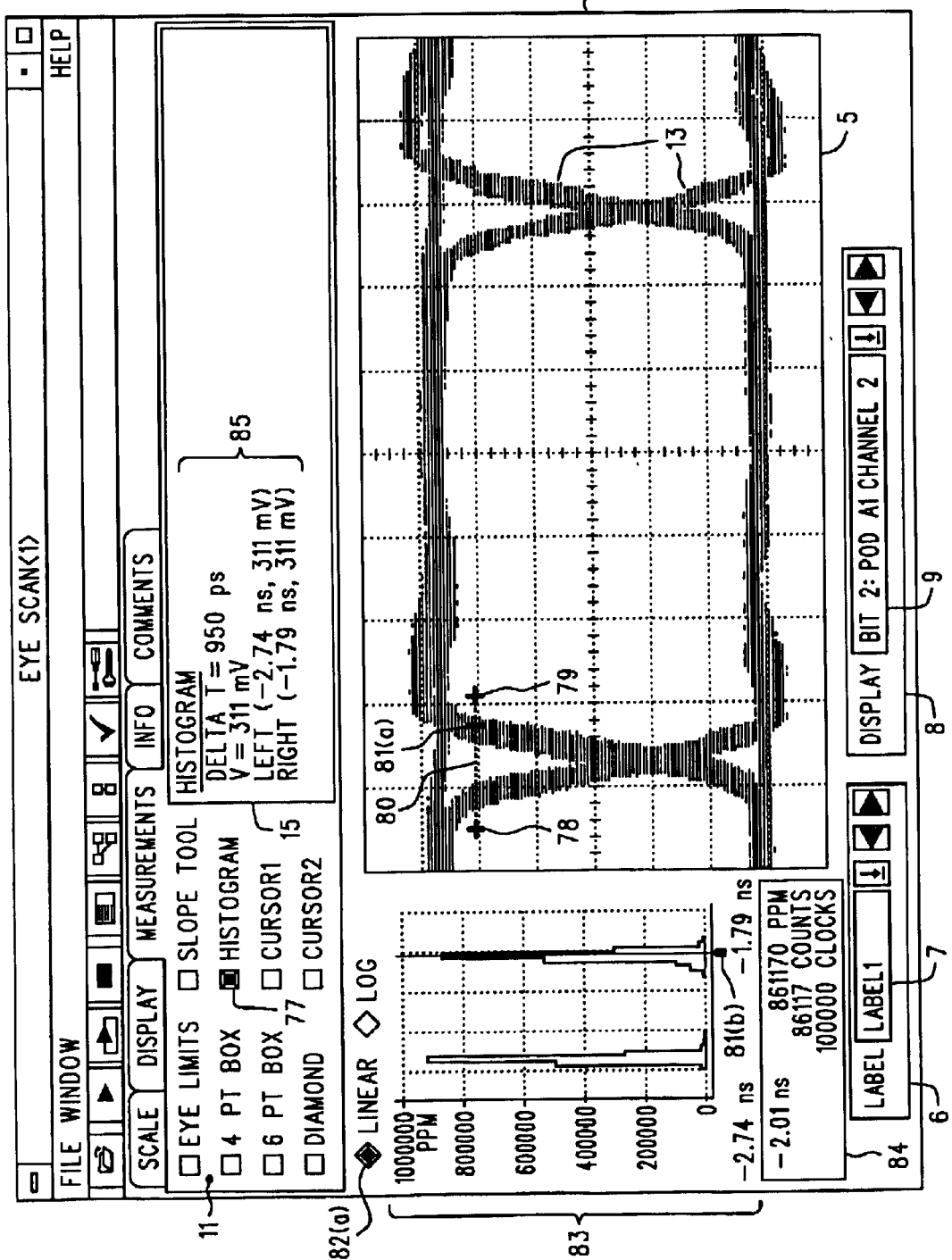
Figure 19:
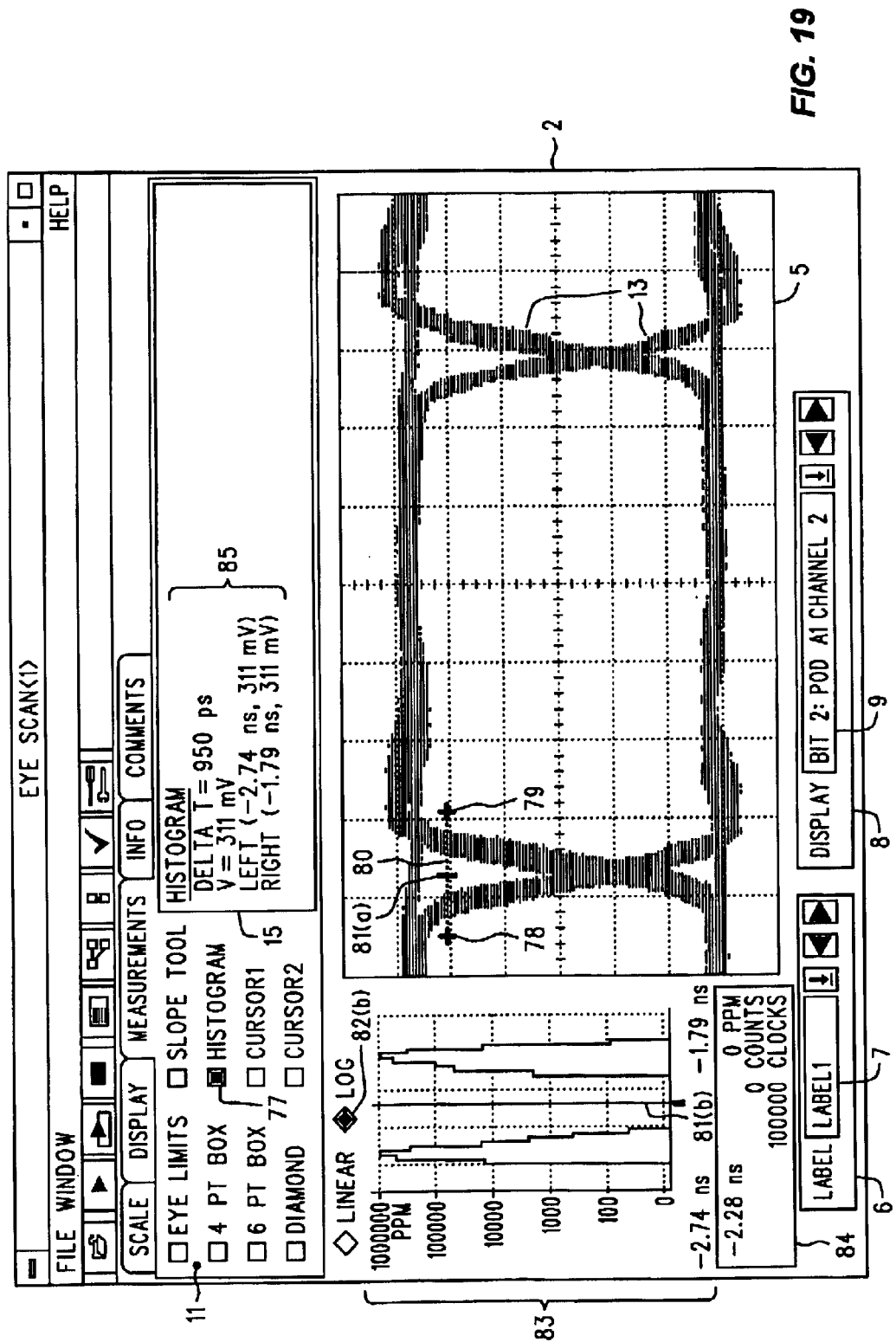

We turn now to FIG. 17 as part of a further explanation of the HISTOGRAM measurement and how it is used to gather information about the eye diagram 13. FIG. 17 is the same as FIG. 16, except that the locator cursors 81 have been moved to onto a portion of the trace of the eye diagram 13 (from the earlier time value of −2.28 ns to a new time value of −2.53 ns). This change is reflected in several locations. First the new time value is indicated by different (and corresponding) physical locations of the two locator cursors 81(a) and 81(b). Next, the digital value "−2.53 ns" appears both in box 86 and in the HISTOGRAM cursor area 84. Next, although the histogram itself has not changed (assuming the acquisition of data is concluded, and that the size and location of line 80 has not changed), the remaining content reported in the HISTOGRAM cursor area 84 does change to reflect the value of the histogram at the new cursor location. FIG. 18 is very similar to FIG. 17, except that now the locator cursors 81 have been positioned over a different portion of the histogram. FIG. 19 has already been described as the same as FIG. 16, except that LOG (82(b)) has been selected instead of LINEAR (82(a)).

Figure 20:
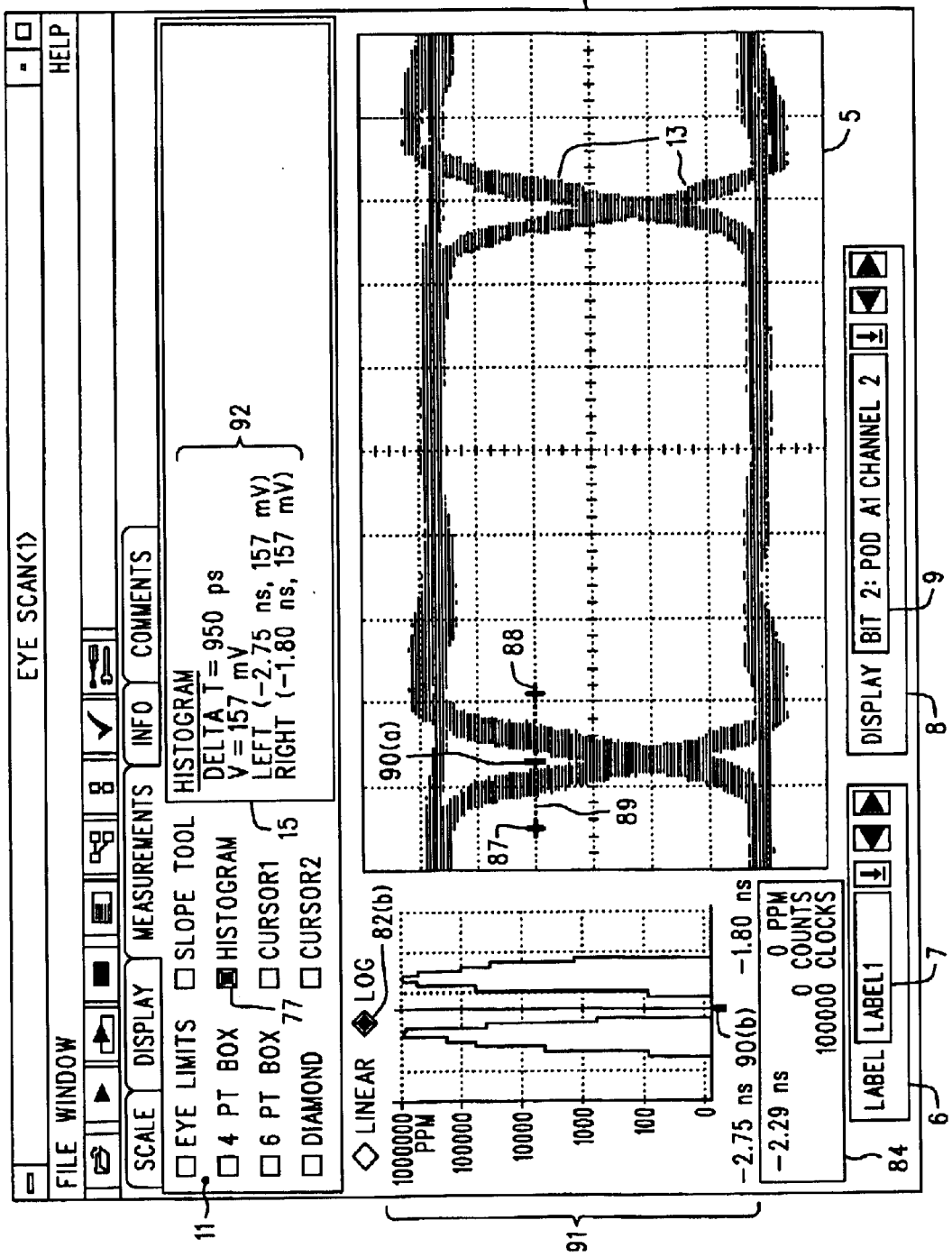
Figure 21:
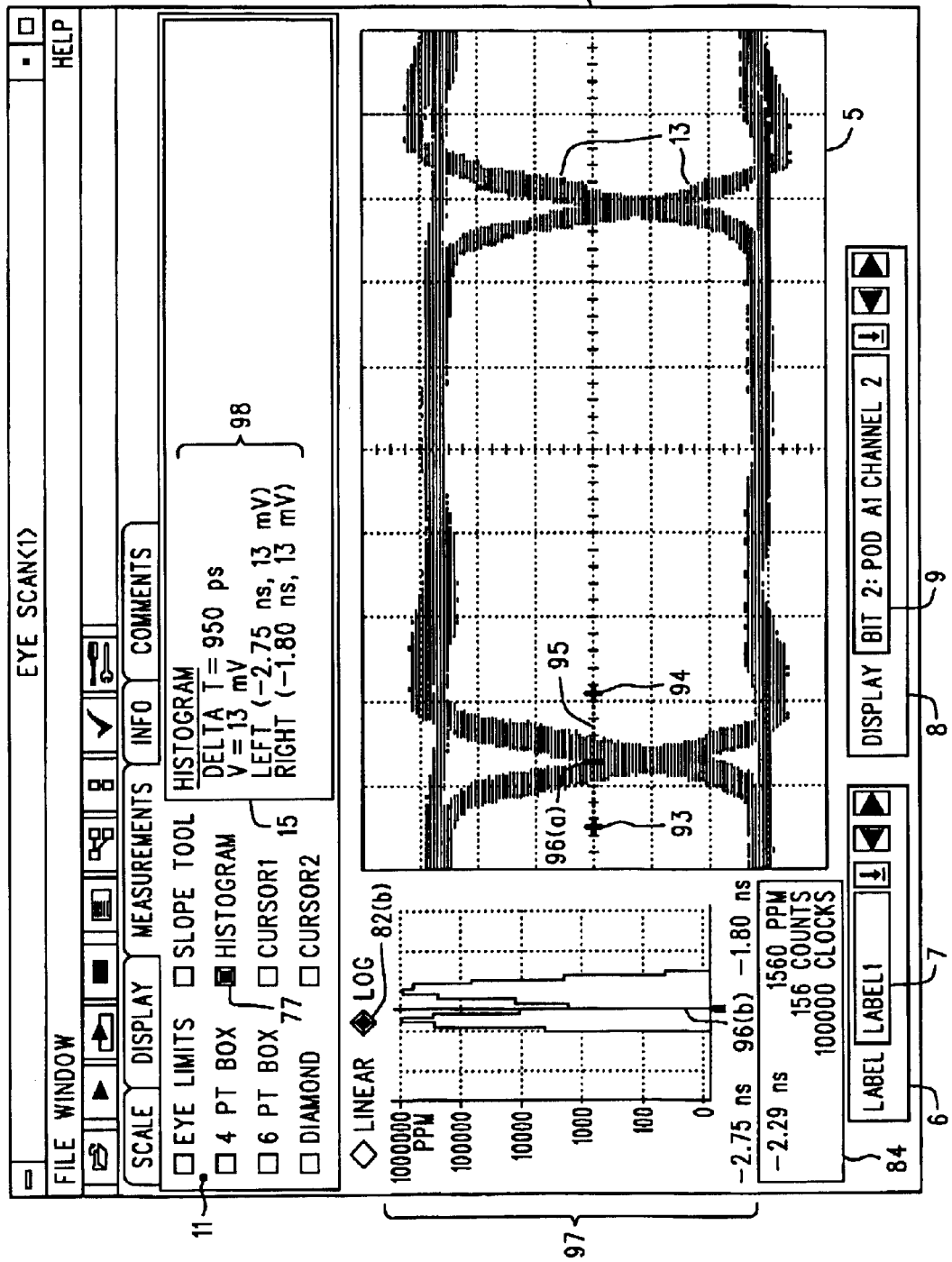

Now consider FIG. 20. LOG remains selected, but the location of line 80 has been shifted from 311 mV downward to 157 mV, and the time has been shifted 10 ps forward. Compare reported data 92 in message area 15 of FIG. 20 to reported data 85 in FIG. 19. The result is a different histogram 91 in FIG. 20; its peaks are noticeably closer together, in accordance with the shape of the eye diagram 13 at the time and voltage. FIG. 21 shows similar changes as the location of the line 80 is moved still lower in voltage, to 13 mV. Note the corresponding change in the shape of the histogram 97 and the changes in the reported values 98 in message are 15 as well as in box 84.

Figure 22:
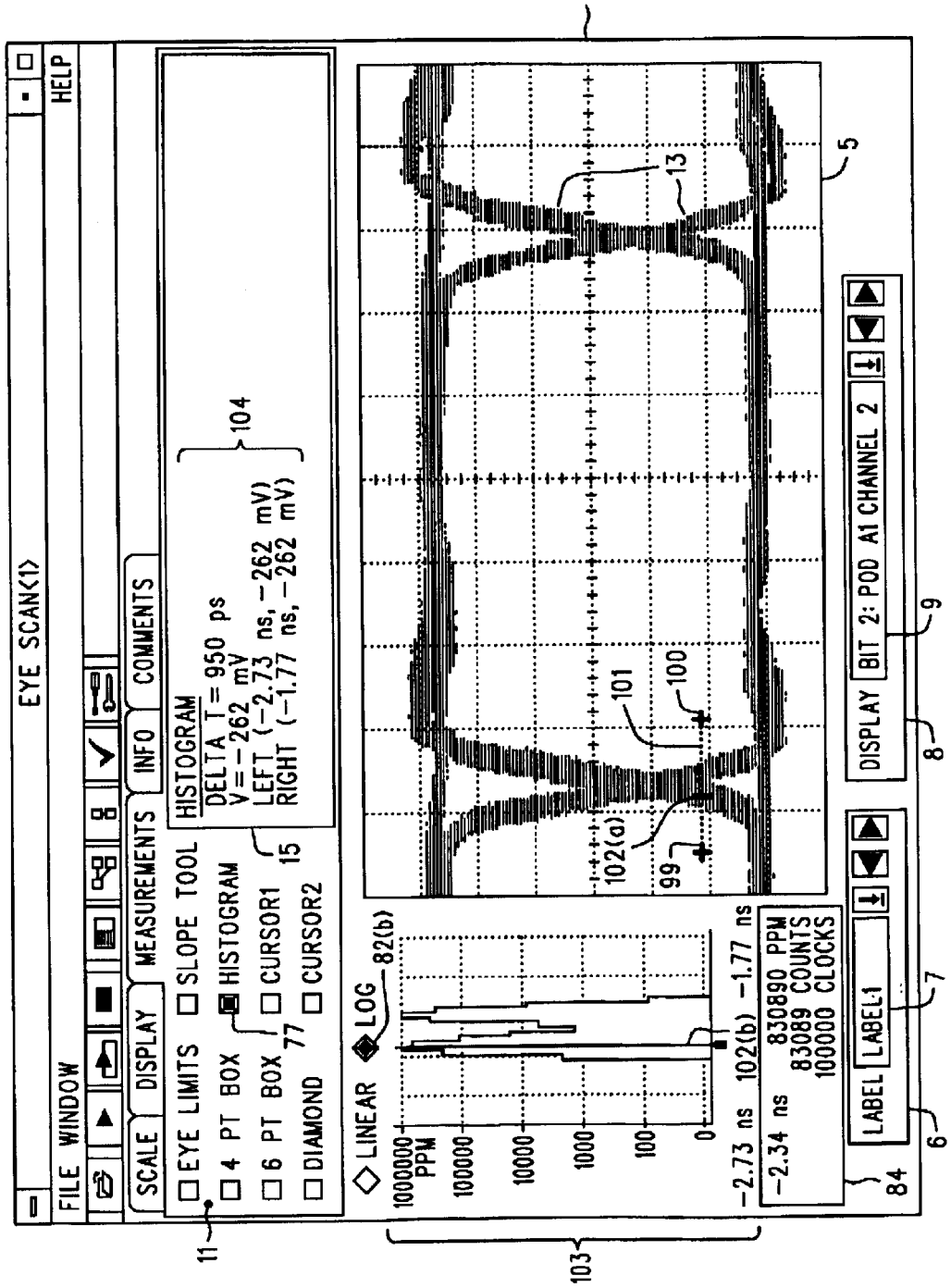
Figure 23:
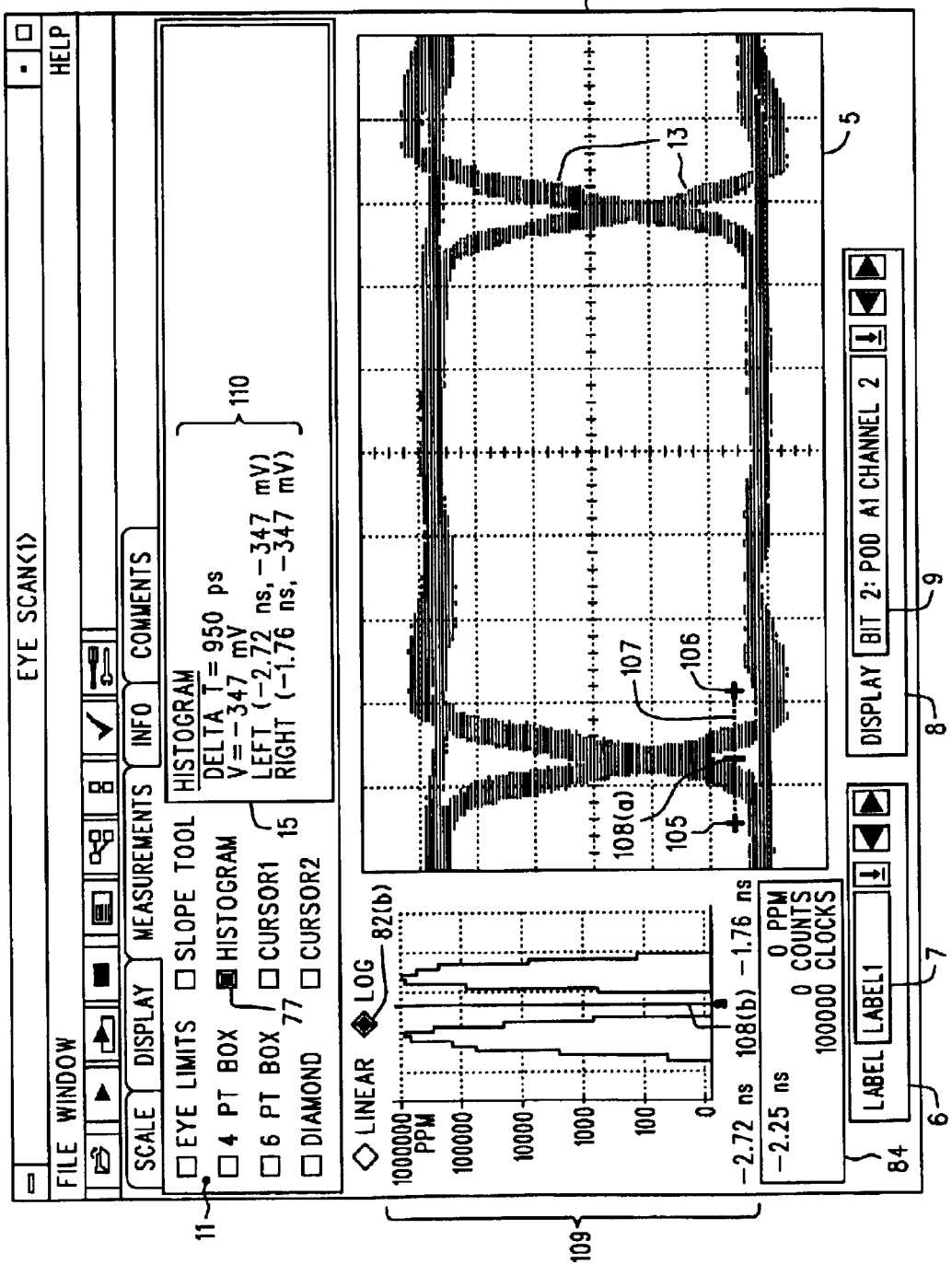

FIGS. 22 and 23 continue in this vein. In FIG. 22, and as indicated by reported data 104, the line 101 is moved still lower to a value of −262 mV, and end points 99 and 100 shifted further forward, and with still another value for the locator cursors 102. Note that histogram 103 has a changed shape. In FIG. 23, and as indicated by reported data 110, the line 107 is even further lower to a value of −347 mV, and end points 105 and 106 shifted even further forward, and with even another value for the locator cursors 108. Note that histogram 109 again has a changed shape.

Figure 24:
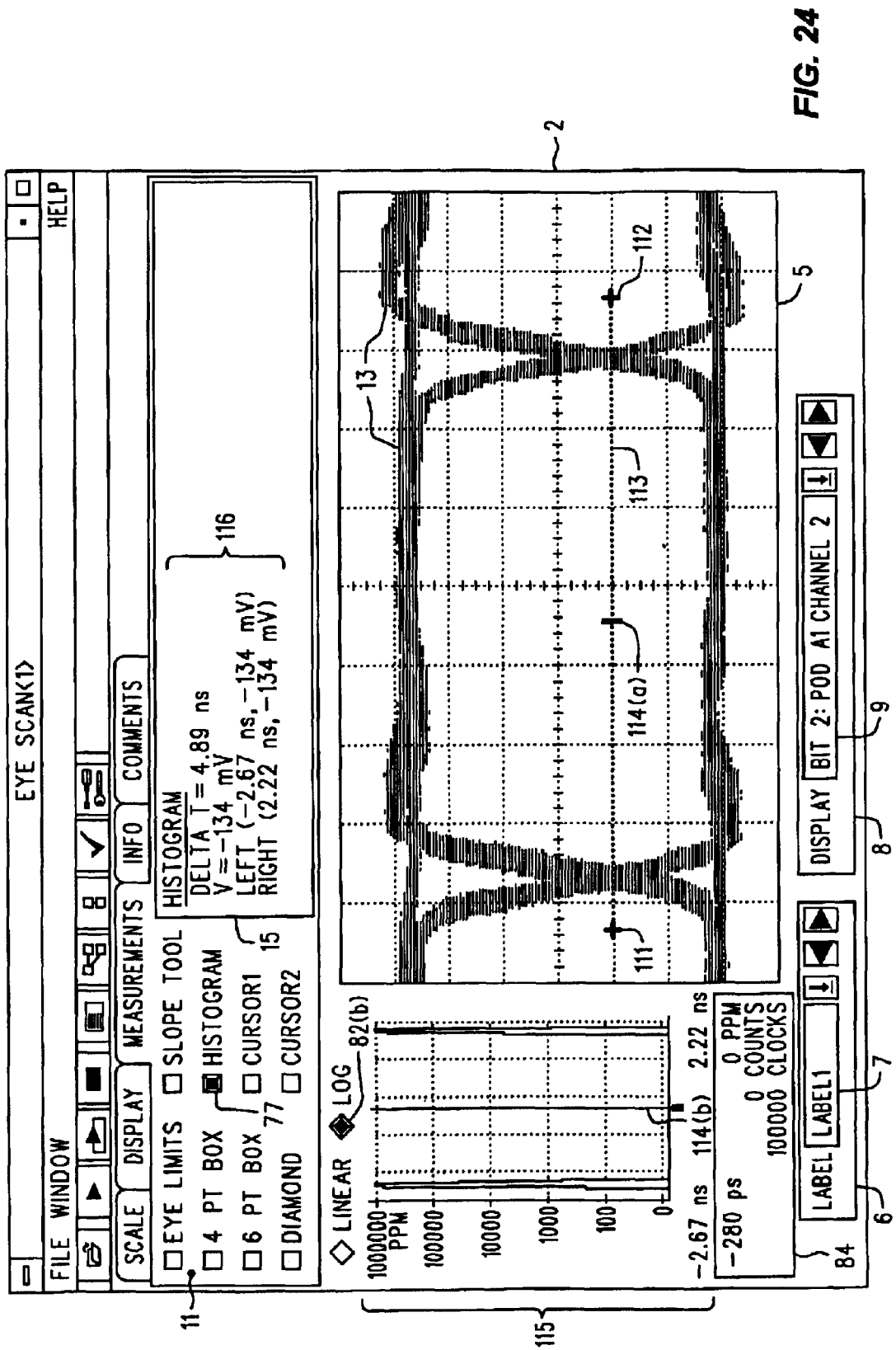

In final reference to HISTOGRAM measurements having a horizontal slice, note FIG. 24. In the measurement of that figure the line 113 has been adjusted so that its endpoints 11 and 112 encompass an entire cycle of the eye diagram 13. The voltage level selected (−134 mV) is near the cross over point in the eye diagram such that only two regions of the line 113 intersect the eye diagram. Accordingly, there are two peaks in the histogram 115. The particulars of the line 113 are reported (116) in message area 15. The location of the cursors 114 is such (−280 ps) that no eye diagram data out of 100,000 clocks occurred at (time, voltage) coordinates of (−280 ps, −134 mV), as indicated by the eye diagram 13 itself, the histogram 115 and the contents reported in the HISTOGRAM cursor area 84.

Figure 25:
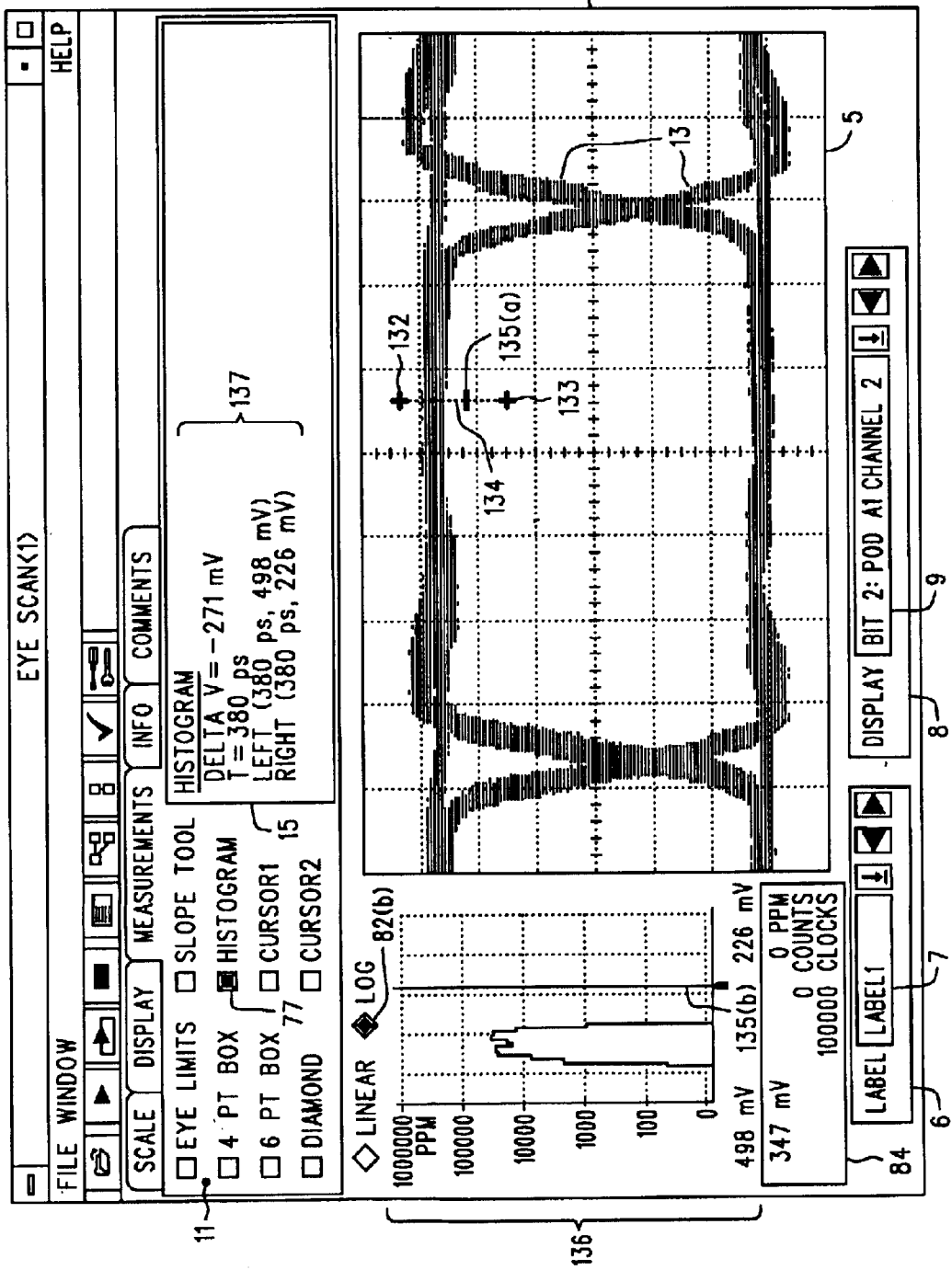

Refer now to FIG. 25, which is a depiction of a Histogram measurement performed upon an eye diagram 13 using a vertical slice defined by endpoints 132 and 133 and the line 134 therebetween. The two endpoints have the same time value, but different voltage values, as indicated by the various values 137 reported in message area 15. The histogram for a vertical slice such as this is useful in characterizing voltage distribution (jitter) at the location of the data signal indicated by the time specified by the slice. As before, a pair of linked cursors 135(a) and 135(b) move together, 135(a) on line 134 and 135(b) on the voltage axis of the histogram 136. In this particular example those cursors are at a value of 347 mV, which value is indicated at the upper left of box 84.

Figure 26:
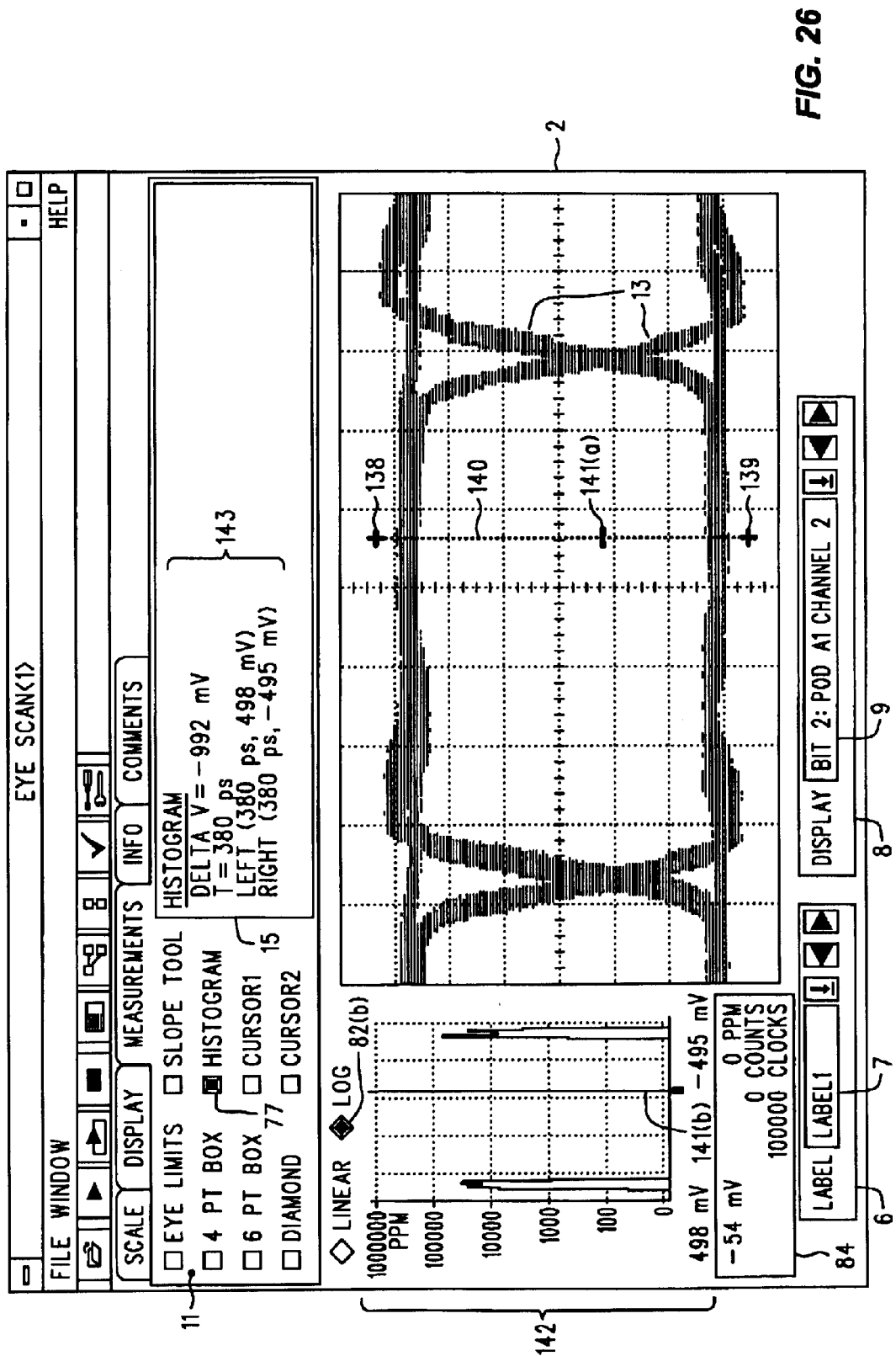

FIG. 26 is another Histogram measurement made with a vertical slice. This time the points 138 and 139 defining the slice, and the line 140 therebetween, are set sufficiently far apart to intersect both voltage extremes of the eye diagram 13. The result is shown as histogram 142, which is correspondingly bifurcated into two peaks. As before, the text 143 shown in message area 15 reports the particulars of the slice, and the value (−54 mV) of the cursors 141(a) and 141(b) is shown in the upper lefthand corner of box 84.

Figure 27:
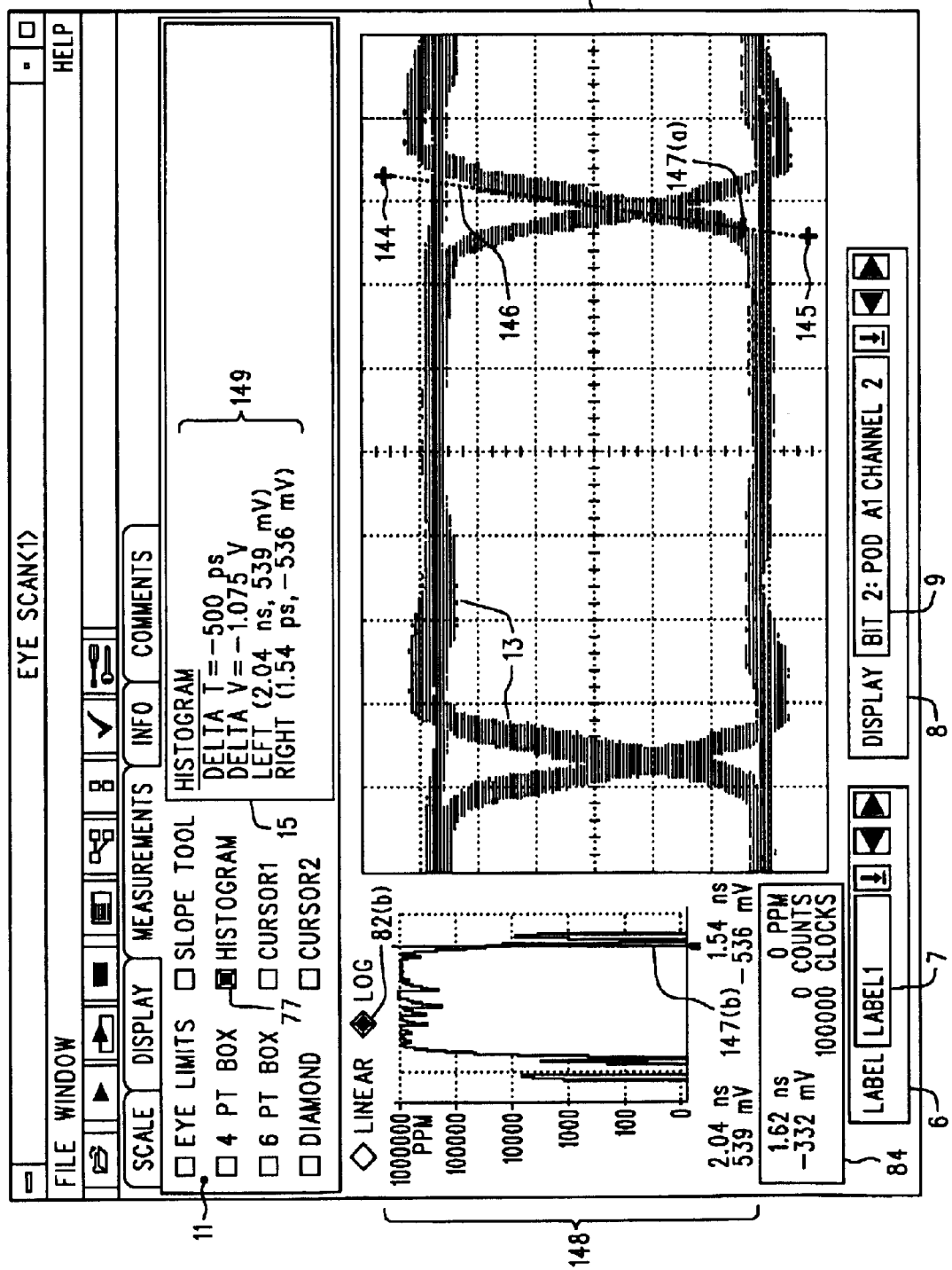

As a final illustration of the Histogram measurement, note the situation depicted in FIG. 27. Here, the slice used to define the range of the histogram is tilted (i.e., is neither horizontal nor vertical). That is, each different point along the slice has both a different voltage and a different time value. As before, the histogram indicates how many hits occurred at those various locations along the slice. Thus, the slice is, in the example of FIG. 27, defined by endpoints 144 and 145, and the interconnecting line 146. There is a moveable cursor 147(a) along that line that has a counterpart 147(b) along the "slice axis" of the histogram 148. The ends of the "slice axis" must be defined with both voltage and time values (left=1.62 ns & −332 mV, right=1.54 ns & −536 mV), as reported by the values 149 shown in message area 15. The location of the cursors 147(a/b) is likewise a pair of (time, voltage) coordinates, which is this particular example is shown in the upper lefthand portion of box 84 as being 1.62 ns and −332 mV.

Figure 28:
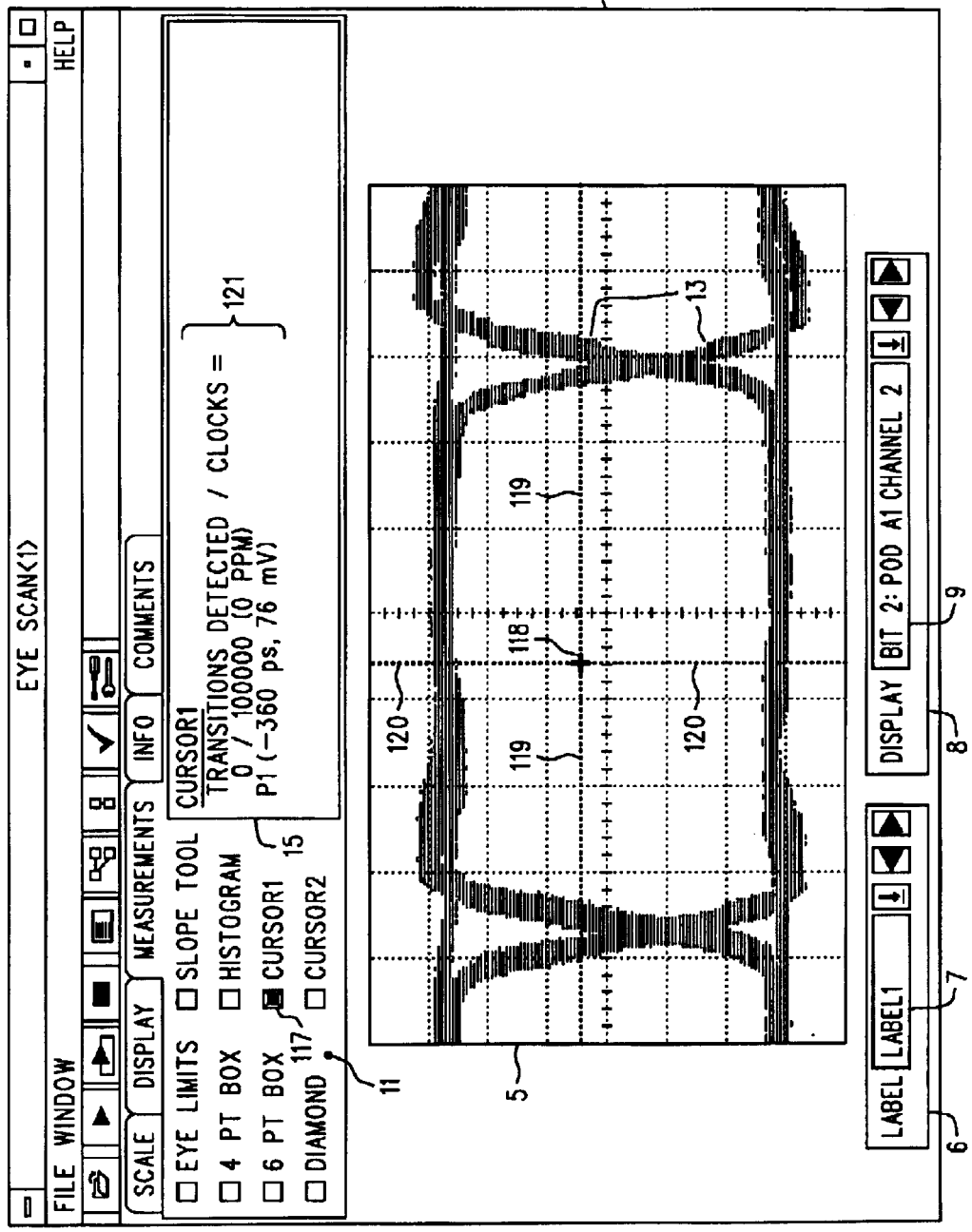
FIGS. 28 and 29 are eye diagram presentations illustrating measurements made with a cursor called Cursor1.
Figure 29:
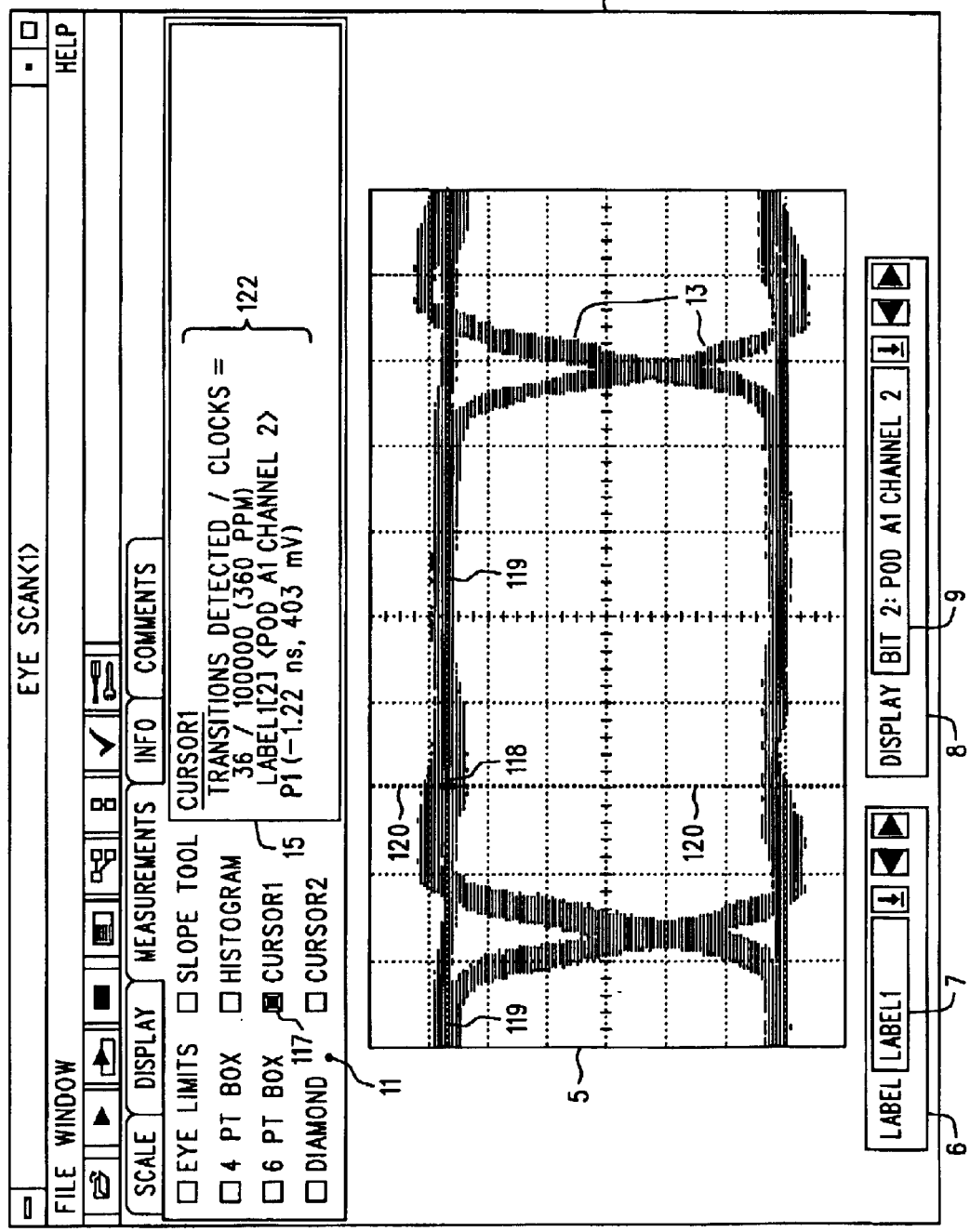
Figure 30:
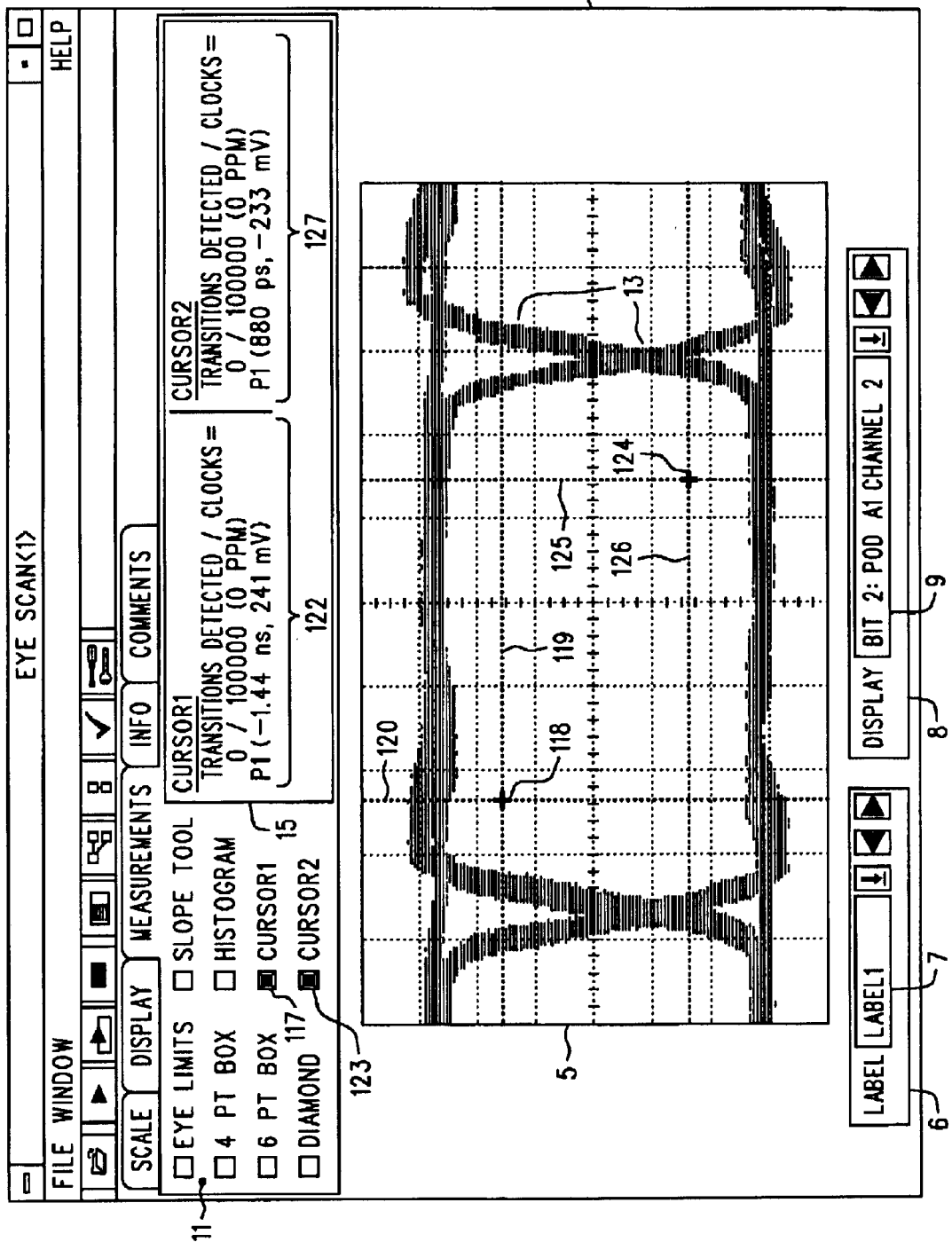
FIG. 30 is an eye diagram presentation illustrating measurements made with a cursor called Cursor1 and another cursor called Cursor2.

Refer now to FIG. 28, wherein is depicted a CURSOR1 on-screen measurement initiated by checking box 117. This automatically places onto the eye diagram 13 a cursor 118 through which extends a horizontal line 119 and a vertical line 120. Text 121 reported in the message area 15 gives the particulars about the position (P1) of the cursor 118, whose name is CURSOR1 (to distinguish it from another similar cursor named CURSOR2). In the example of FIG. 25 the position P1 of CURSOR1 is −360 PS and 76 mV. No transitions are detected, since CURSOR1 118 is not positioned over the trace of the eye diagram 13. CURSOR1 118 can be repositioned by grabbing and then dragging the CURSOR1 icon itself, or by individually adjusting one of the lines 119 (vertically) or 120 (horizontally), one at a time. FIG. 29 is the same as FIG. 28, except that CURSOR1 118 has been repositioned to lie upon the trace of the eye diagram. The reported text 122 in the message area 15 reflects the difference, including indicating what signal was responsible for the hits at the location in the eye diagram 13 occupied by CURSOR1 118; and FIG. 30 is similar to FIG. 29, except that in addition to CURSOR1, a second on-screen measurement using another cursor named CURSOR2 has been initiated by checking box 123. Additional information that is now displayed includes information 127 reported about CURSOR2 in message area 15, as well the second cursor CURSOR2 124 itself, with its two lines 125 and 126.

Figure 31:
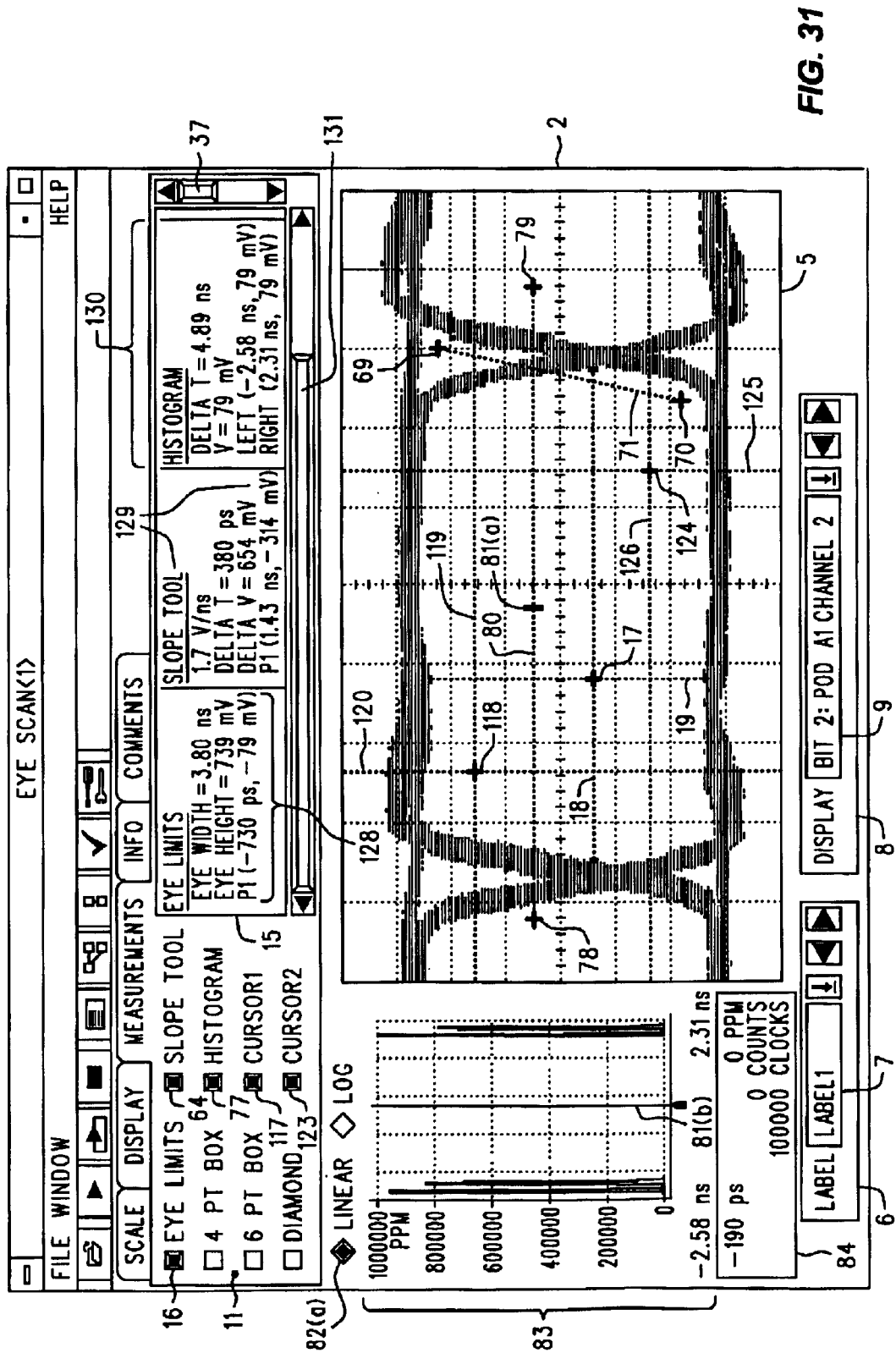
FIG. 31 is an eye diagram presentation illustrating a plurality of simultaneously performed measurements using all of the aforementioned on-screen tools except the Four and Six Point Boxes and the Diamond.

Finally, note FIG. 31, wherein five simultaneous on-screen measurements are in effect. These are indicated by the checked boxes 16, 64, 77, 117 and 123. We decline to go through it all again, and shall be satisfied to point out that they are all there, and can be adjusted at will as previously described, and that it is indeed possible to unambiguously determine which line and cursor symbol or other icon goes with which on-screen measurement. Do note, however, that the various reported particulars 128, 129 and 130 that appear in the message area 15 completely consume that region, so that menu sliders 37 and 131 are needed (and are automatically provided by the system) to access all such reported information.

Having described the nature of the on-screen measurements that are provided in an Eye Diagram Analyzer constructed in accordance with a preferred embodiment, we now turn to a general discussion of how all that good stuff can be accomplished. For want of a better place to do so, we shall start at the beginning, although we shall go very fast. More leisurely discussions (but that do not necessarily touch on all topics of interest here) may be found in the incorporated Cases.

The data acquisition hardware may be described as operating in response to the selection of six parameters: $V_{min}$, $V_{max}$, $V_{res}$, $T_{min}$, $T_{max}$, and $T_{res}$. These values can be selected with certain resolutions and over limited ranges, all determined by what the measurement hardware is capable of. The net effect is that data is acquired over a two dimensional array of (time, voltage) pairs that is arranged for the convenience of the hardware. This underlying structure survives into what we have called the data structure that the acquired data is stored in. The complete data structure contains other information, such as a hit count, channel number and so forth, but is still acquisition hardware oriented.

The content of the acquisition data structure needs to be interpolated and formatted to produce a displayed eye diagram. By this we mean that the size in pixels of the space in which the eye diagram is to be shown, as well as exactly which sub-set of the entire acquisition data structure is to be shown, affect the resulting pixel values that are put into the frame buffer and displayed. Clearly, there is more to this than deciding which color or what intensity goes with how many hits out of some total number of measured clocks, although those decisions must be made, too.

Instead, we are initially concerned with the more fundamental problem of getting a picture or image, described in one (X, Y) coordinate grid system starting at $(X_0, Y_0)$ and proceeding in steps of $\Delta x$ and $\Delta y$, to seem reasonable and useful when actually displayed in another coordinate grid system $(X'_0, Y'_0)$ whose steps are $\Delta x'$ and $\Delta y'$. Furthermore, the general case is that $X_0 \neq X'_0$ AND (or at least OR) $Y_0 \neq Y'_0$. That is, we as users have some influence, but not total explicit control, over the values for $X_0$, $X'_0$, $Y_0$, $Y'_0$, $\Delta x$ and $\Delta y$, and $\Delta x'$ and $\Delta y'$. Why is it that these coordinate grid systems are not always equal? Well, the user can pan and zoom, and after that the portion of the display that is allocated to the eye diagram image (i.e., item 5 as opposed to item 2 in FIG. 1) is some arbitrary number of pixels that is perhaps known in advance (as in our case), but then again, perhaps is not. Also, the eye diagram image we wish to produce is simply the content of only some portion of the actual frame buffer; there are other sub-systems in operation that need their stuff displayed, too. And we have not even considered the future case where the user connects a higher resolution monitor not available at the time of manufacture, and expects it to behave in a rational manner. This is indeed quite a bag of snakes.

Fortunately, there is a conventional and entirely adequate way of bringing order to what would otherwise be a really messy situation. That is, what we need now is genuine device independent programming for image output. Which is to say, we need something like X Windows (as developed by the X Consortium inspired by MIT, and which presently goes by the name X11). Nearly every UNIX or UNIX-like operating system (including the LINUX distributions) supports X11, or as it is affectionately called, just "X"; as in "X does this" or "X does that". Some opinions hold that it is at present the premier tool for device independent graphics programming. The X Window system is the preferred window manager for use with the On-Screen Measurements described herein, although we admit that the Microsoft product could be made to work.

X11 is a complex system. O'Reilly & Associates, Inc. of Sebastopol, Calif., publishes books that explain and document the X Window System. A 1992 set of manuals for Releases 4 and 5 runs to six volumes (zero through five) taking almost an entire foot of shelf space! Nor does that count the introductory tutorials published by others. The O'Reilly books most of interest to our present readers would probably be volumes zero through two: "X Protocol Reference Manual", "Xlib Programming Manual" and the "Xlib Reference Manual". The X Window system does much more than we need for the purposes of this disclosure (it assumes networked connections between devices, supports security against promiscuous connections, understands that devices can be on multiple machines and allows devices on remote machines, etc.). One capability it has that we do want, however, is a tool kit for managing screen pointer motion, clicking on things for menu selection, scroll bars and all that kind of interaction with the user needed to build a GUI (Graphical User Interface).

The eye diagram analyzer does a conversion of the eye diagram image data stored in the acquisition data structure to account for the panning and zooming that has been requested, and does so in light of the size in pixels that will be available to display it. The size in pixels comes from an inquiry to the X Window system, and may be different from time to time if a different display device is in use, or the user has re-sized the window. The actual acquired data in the acquisition data structure may be construed as a first array of rectangles arranged on a (T, V) plane, where the size of the rectangles is determined by acquisition hardware settings. (The center of each rectangle is the sampled point.) The content of those rectangles is what got measured (counts of hits, etc.). This first array of measurement rectangles is big; it is essentially the entire measurement.

Now consider a second array of rectangles to be superimposed over the first. The entirety of the second array represents the window within which the panned and zoomed subset is to be displayed. The center values of each of the rectangles in the second array are determined by the time and voltage parameters the user wishes the displayed image to have (the afore-mentioned $(X'_0, Y'_0)$ whose steps are $\Delta x'$ and $\Delta y'$, and which may be quite different from the acquisition values!). The second array of rectangles has an overall size in the horizontal and vertical directions that is equal to the range in time and voltage that the user wishes to see, but those ranges are quantized into the pixels that comprise the destination window. The position of the second array upon the first array is determined by panning. The two arrays of rectangles do not necessarily line up on the rectangle boundaries, even if the rectangles are the same size (which, in general, they are not); in general, the rectangles will be more or less overlapping in both directions. Their axes will be parallel, but either array could have the larger rectangles. Our task is to transfer the information content from the first array to the second array. This task involves an interpolation by area of overlap, while taking into account that certain of those overlapping rectangles should be accorded greater weight, while some might not be due any, depending on where the hits occurred during the measurement. That is, a rectangle has values that fall within ranges, just as a pixel location can have a color and an intensity. In any event, this sort of image mapping from one environment to another is conventional, and is practiced by various graphics systems in the transformation and re-sizing of an image. Once the conversion is done, we give it to the X Window system and tell it to display it. We also use X to apply annotations, and to report screen pointer icon position within the window.

We can use screen pointer icon position, in conjunction with the internal operation of the interpolation process, to establish a correspondence between what is pointed at on the screen and the actual associated locations in the measured data. The incorporated application entitled IDENTIFICATION OF CHANNELS AND ASSOCIATED SIGNAL INFORMATION CONTRIBUTING TO A PORTION OF A COMPOSITE EYE DIAGRAM discloses techniques that bear on this process. In any event, we are obliged to point to three cases.

First, the particular On-Screen Measurement of interest can then, for some On-Screen Measurements, proceed using the actual measured data, rather than the processed-for-display version seen in the window. This approach make the most sense for the Box, Diamond and Histogram measurements. For these On-Screen Measurements, it is probable that the majority of cells in the acquisition data structure would fall entirely within, or entirely outside of, the box or diamond. There will be some that "touch". And for the histogram, they would either touch the line performing the slice, or they would not. On average, we get a very fine answer by simply adopting a rule such as the following for deciding whether to accept or reject a value: "Touching on the top or on the left is IN, touching on the bottom or on the right is OUT. Otherwise, if its inside the box it is IN, else OUT." A rule like this dispenses with area based interpolation (a savings in complexity), but the "ragged edges" produced tend to (a) cancel each other, and (b) tend to involve a tiny percentage of the overall measurement value, anyway.

Second, for other measurements, the actual acquired data is re-processed by area based interpolation, just as it was for image creation, so that the pixel locations and values used in the measurement are just as if they had been taken from the frame buffer. (We could have actually saved the interpolation results sent to the frame buffer, but choose instead to save that memory and spend execution time to re-create the results.) The Eye Limits measurement is done this way, since it seems useful to avoid a situation where the reported values seem slightly inconsistent with what the extended cursor line appears to have done. That is, it may be risky to show the user a result related to image size computed in one data environment, while the image for it is made in another data environment.

Third, there is still another case, where it is not necessary to re-visit the original data at all. To report the slope of a line drawn on the screen requires only knowledge of the line and of the units used. (We rely on the user to get his line parallel to the segment of data he is "measuring".)

I claim:

1. A method of measuring an eye diagram, the method comprising the steps of:
   (a) repeatedly sampling the value of a periodic data signal at different times relative to a reference signal to create a stored data structure representing instances within the duration of this step that different (time, voltage) pairs are exhibited by the data signal when it is sampled;
   (b) traversing the data structure to construct in a frame buffer pixel information representing the eye diagram;
   (c) displaying the eye diagram represented by the frame buffer;
   (d) selecting a box measurement;
   (e) positioning an image of a box to a selected location within the display of the eye diagram;
   (f) re-sizing the image of the box to a desired size;
   (g) examining the data structure to determine the number of instances any (time, voltage) pair belonging to the eye diagram occurred within a region of (time, voltage) pairs delimited by the image of the box; and
   (h) reporting the number of instances determined in step (g).

2. A method as in claim 1 wherein the box is a rectangle defined by four points, has top and bottom edges that are parallel to the time axis of the eye diagram and has left and right edges that are parallel to the voltage axis of the eye diagram.

3. A method as in claim 1 wherein the box is defined by six points and has six sides, two of which are top and bottom edges that are parallel to the time axis of the eye diagram, two of which are left side edges and two of which are right side edges.

4. A method as in claim 1 further comprising the step of reporting the (time, voltage) coordinates of the points defining the box.

5. A method of measuring an eye diagram, the method comprising the steps of:
   (a) repeatedly sampling the value of a periodic data signal at different times relative to a reference signal to create a stored data structure representing instances within the duration of this step that different (time, voltage) pairs are exhibited by the data signal when it is sampled;
   (b) traversing the data structure to construct in a frame buffer pixel information representing the eye diagram;
   (c) displaying the eye diagram represented by the frame buffer;

(d) selecting an eye limits measurement;

(e) positioning a measurement cursor icon to an arbitrary a location of interest, selected by a user, within the display of the eye diagram;

(f) automatically extending horizontal and vertical lines from the measurement cursor icon until an examination of the data structure indicates that an end point on each extended line intersects the eye diagram; and (g) reporting the difference in the end points of the vertical lines as a voltage representing eye opening height and the difference in the end points of the horizontal lines as a time representing eye opening width.

6. A method as in claim 1 further comprising the step of reporting the arbitrarily user-selected (time, voltage) coordinates of the measurement cursor icon as positioned by step (e).

7. A method of measuring an eye diagram, the method comprising the steps of:

(a) repeatedly sampling the value of a periodic data signal at different times relative to a reference signal to create a stored data structure representing instances within the duration of this step that different (time, voltage) pairs are exhibited by the data signal when it is sampled;

(b) traversing the data structure to construct in a frame buffer pixel information representing the eye diagram;

(c) displaying the eye diagram represented by the frame buffer;

(d) selecting a diamond measurement;

(e) positioning an image of a diamond to a selected location within the display of the eye diagram, the image of the diamond defined by four vertices, two of which lie on a line parallel to the voltage axis of the eye diagram and two of which line on a line parallel to the time axis of the eye diagram;

(f) re-sizing the image of the diamond to a desired size;

(g) examining the data structure to determine the number of instances any (time, voltage) pair belonging to the eye diagram occurred within a region of (time, voltage) pairs delimited by the image of the diamond; and (h) reporting the number of instances determined in step (g).

8. A method as in claim 7 further comprising the step of reporting the (time, voltage) coordinates of the points defining the diamond.

9. A method of measuring an eye diagram, the method comprising the steps of:

(a) repeatedly sampling the value of a periodic data signal at different times relative to a reference signal to create a stored data structure representing instances within the duration of this step that different (time, voltage) pairs are exhibited by the data signal when it is sampled;

(b) traversing the data structure to construct in a frame buffer pixel information representing the eye diagram;

(c) displaying the eye diagram represented by the frame buffer;

(d) selecting a slope measurement;

(e) positioning two endpoints and a line therebetween to a selected location within the display of the eye diagram; and (f) automatically reporting the slope dv/dt of the line of step (e).

10. A method as in claim 9 further comprising the step of reporting the (time, voltage) coordinates of the endpoints, their difference in time $\Delta t$ and their difference in voltage $\Delta v$.

11. A method of measuring an eye diagram, the method comprising the steps of:

(a) repeatedly sampling the value of a periodic data signal at different times relative to a reference signal to create a stored data structure representing the number of instances within the duration of this step that different (time, voltage) pairs are exhibited by the data signal when it is sampled;

(b) traversing the data structure to construct in a frame buffer pixel information representing the eye diagram;

(c) displaying the eye diagram represented by the frame buffer;

(d) selecting a histogram measurement;

(e) selecting the length and position of an image of a line within the display of the eye diagram by defining the two endpoints of the line;

(f) examining the data structure to determine the number of instances that any (time, voltage) pair belonging to the eye diagram lies on the line defined by the endpoints of step (e); and (g) displaying a histogram of the number of instances found in step (f), the abscissa of the histogram representing positions along the line selected in step (e).

12. A method as in claim 11 wherein the line of step (e) and the histogram of step (g) each contain respective cursor icons and further comprising the steps of moving the location of one of the cursor icons to a selected location and of automatically moving the other to the corresponding location.

* * * * *